US012129765B2

(12) United States Patent
Woszczak et al.

(10) Patent No.: US 12,129,765 B2
(45) **Date of Patent: *Oct. 29, 2024**

(54) METHOD AND SYSTEM FOR COMPONENT ALIGNMENT IN TURBINE CASING AND RELATED TURBINE CASING

(71) Applicant: General Electric Company, Schenectady, NY (US)

(72) Inventors: Krzysztof Andrzej Woszczak, Warsaw (PL); William Patrick Rusch, Schenectady, NY (US); Samuel Nathan Merrill, Scarborough, ME (US); Ejiro Anthony Oruaga, Minneapolis, MN (US); David John Nelmes, Lutterworth (GB); Justyna Ludwika Wojdyło, Warsaw (PL); John Francis Nolan, Schenectady, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,567

(22) Filed: Nov. 10, 2023

(65) Prior Publication Data

US 2024/0077000 A1 Mar. 7, 2024

Related U.S. Application Data

(63) Continuation of application No. 17/755,260, filed as application No. PCT/PL2019/050058 on Oct. 28, 2019, now Pat. No. 11,859,507.

(51) Int. Cl.

*F01D 25/24* (2006.01)
*F01D 21/00* (2006.01)

(Continued)

(52) U.S. Cl.

CPC ......... *F01D 25/243* (2013.01); *F01D 21/003* (2013.01); *F01D 25/02* (2013.01);

(Continued)

(58) Field of Classification Search

CPC ...... F01D 25/24; F01D 25/243; F01D 25/246; F01D 25/28; F01D 21/003; F05D 2230/644; F05D 2260/30; F05D 2240/14

See application file for complete search history.

(56) References Cited

U.S. PATENT DOCUMENTS 6,594,555 B2 7/2003 Steingraeber
6,665,589 B2 12/2003 Steingraeber (Continued)

FOREIGN PATENT DOCUMENTS

EP 3324005 A1 5/2018
JP 2004516415 A 6/2008

(Continued)

OTHER PUBLICATIONS

International Search Report and Written Opionion for application No. PCT/PL2019/050058 dated Mar. 12, 2020, 14 pages.

(Continued)

*Primary Examiner* — David E Sosnowski
*Assistant Examiner* — Maxime M Adjagbe
(74) *Attorney, Agent, or Firm* — James Pemrick; Charlotte Wilson; Hoffman Warnick LLC

(57) ABSTRACT

A method and system for aligning a component within a turbine casing, and a related turbine casing, are disclosed. In a top-on position, a location of a reference point and another, vertically spaced reference point on the lower casing are measured. After removing at least the upper casing, the reference points' locations are measured again, and the locations of a reference point on an upper surface of the HJ flange are measured. A prediction offset value is calculated (Continued)

for the component support position in the top-on position based on the locations. The prediction offset value may include a vertical adjustment based, in part, on a translation of a triangular spatial relationship of a number of the reference points and/or a tilt angle, a horizontal adjustment, and a HJ flange surface distortion adjustment. The component support position is adjusted by the prediction offset value to improve alignment.

20 Claims, 17 Drawing Sheets

(51) Int. Cl.
*F01D 25/02* (2006.01)
*F01D 25/28* (2006.01)

(52) U.S. Cl.
CPC ........ *F01D 25/28* (2013.01); *F05D 2230/644* (2013.01); *F05D 2240/14* (2013.01); *F05D 2250/11* (2013.01); *F05D 2260/30* (2013.01)

(56) References Cited

U.S. PATENT DOCUMENTS

| | | | |
|---|---|---|---|
| 8,834,113 | B2 | 9/2014 | Schaus et al. |
| 2002/0082726 | A1 | 6/2002 | Steingraeber |
| 2006/0101643 | A1 | 5/2006 | Adinarayana et al. |
| 2018/0142571 | A1 | 5/2018 | Mizumi et al. |
| 2018/0307205 | A1 | 10/2018 | Yashirodai et al. |

FOREIGN PATENT DOCUMENTS

| | | | |
|---|---|---|---|
| JP | 2016211382 | A | 12/2016 |
| JP | 2018084169 | A | 5/2018 |
| JP | 2018178960 | A | 11/2018 |
| JP | 2019049233 | A | 3/2019 |
| JP | 2019070334 | A | 5/2019 |

OTHER PUBLICATIONS

Non Final Office Action mailed Apr. 14, 2023 for U.S. Appl. No. 17/755,260, filed Apr. 25, 2022; pp. 18.

Notice of Allowance and Fee(s) Due mailed Aug. 8, 2023 for U.S. Appl. No. 17/755,260, filed Apr. 25, 2022; pp. 5.

METHOD AND SYSTEM FOR COMPONENT ALIGNMENT IN TURBINE CASING AND RELATED TURBINE CASING

BACKGROUND OF THE DISCLOSURE

The disclosure relates generally to turbine systems, and more particularly, to a system and method for aligning a component in such turbine systems, and a related turbine casing.

Turbine systems, such as steam turbine (ST) systems or gas turbine (GT) systems, are used in a wide variety of power generating systems. Turbines are typically constructed using one or more removable upper portions (e.g., upper shells or casings) to allow access to components within the turbine. The components within the turbine may include a large number of stationary and rotating components. Rotating components may include one or more wheels, shafts, etc., that rotate during the operation of the turbine. Stationary components may include one or more stationary wheels, diaphragms, support pads, deflectors, casing portions, bearings, etc., that remain stationary during operation of the turbine. Turbines may also include one or more lower portions (e.g., lower shells or casings) that generally serve as a support for the other turbine components and may also assist in sealing the working fluid (e.g., steam or combusted fuel) path to prevent leakage. The upper casing is coupled to the lower casing to create the working fluid path.

Close tolerances among the various components of a turbine directly affect its efficiency. To illustrate, a large steam turbine weighing several tons may have tolerances for internal components measured in millimeters (mm), or in thousandths of an inch (mils). If stationary and rotating components are too close to one another, rubbing between the components may occur during operation. This rubbing makes it difficult to start the turbine after a servicing or overhaul, and generates excessive vibration. The rubbing may also wear the seals between the rotating and stationary components, and after the components have worn, excessive clearance will then exist in the areas in which rubbing occurred. If stationary and rotating components are too far apart from the other, working fluid leakage may occur between the components, reducing the efficiency of the turbine. Accordingly, great care is desirable when servicing or maintaining a turbine to ensure that the various components are aligned and positioned correctly.

During an offline servicing or overhaul of a turbine system, various components of a turbine may be accessed by removing the upper casing or casings, commonly referred to as "tops." With the top-off, stationary and rotating components of the turbine may be inspected, adjusted, cleaned, repaired, replaced, and/or otherwise serviced. One type of inspection may determine the amount of displacement suffered by various components due to turbine operation. For example, certain stationary components might have shifted in alignment. Components that have become misaligned may then be realigned as a part of this inspection. Upon completion of the servicing or overhaul, the upper casing(s) may be replaced, and the turbine returned to operation. Unfortunately, an alignment problem commonly occurs when the top(s) are placed back on the lower casing. The upper casing(s) may weigh one ton or more, and the placement of these upper casing(s) onto the turbine may cause an additional amount of displacement or distortion among the previously-aligned components. Such displacement may generally be referred to herein as 'top-on displacement.' For example, a lower casing might spring up, or bow or sag between support points when in the top-off condition, and one or more stationary components connected to the lower casing, for example, the diaphragm portions, may shift. If the components are aligned with the top-off, they may shift when the tops are placed back on, and may actually shift out of alignment.

To address this problem, it is conventional practice to conduct a top-on/top-off alignment procedure. In this procedure, the upper casing(s) is/are first removed and the various components are removed and serviced, as needed. After these components are removed, the upper casing(s) are replaced, and the various component support positions within the couple casings are measured for position both vertically and transversely with respect to the centerline of the unit. Then, the upper casing(s) are once again removed, and a top-off line is measured. The top-off line measures the transverse and vertical positions of the internal components with the upper casing(s) and/or components removed. Then, these measurements are compared to determine an ideal position for the internal components when in the top-off condition. Then, with the upper casing(s) removed, the component support positions are adjusted to account for the top-on displacement. For example, a seat upon which a diaphragm portion sits may be adjusted to ensure the center of the diaphragm is aligned with the rotor axis. When the tops are placed back on, the components are then expected to shift into alignment. For example, a set of top-on and top-off measurements might show that a particular component shifts upwards 0.25 millimeters (mm) when the tops are placed on. This component may be aligned, in the top-off condition, to be 0.25 mm low to account for this rise.

The top-on/top-off procedure described above helps to ensure that various turbine components are in optimal alignment at the completion of the servicing. However, the top-on/top-off procedure is extremely time consuming. Many hours are required to perform the various measurements, as well as removing and replacing the upper casing(s) twice, resulting in higher costs for personnel time and a greater amount of lost revenue due to the turbine being offline. The process can be further complicated because, when assembled without the rotor and/or other internal components, the full turbine casing is not fully representative of the top-on conditions because some of the internal components, e.g., the diaphragms and carriers, associated with the upper casing and the rotor are not present. The current process can therefore be inaccurate. Consequently, the alignment process may need to be repeated, which adds to costs. One approach to address these issues measures right and left component supports and/or inner shell displacements in a top-off situation, and calculates predicted vertical and/or transverse offset values that are percentages of the measured displacements for adjustment of components. While this approach eliminates the repetitive assembly, it does not consider the complete top-on situation, and can be inaccurate.

BRIEF DESCRIPTION OF THE DISCLOSURE

A first aspect of the disclosure provides a method of aligning a component within a turbine casing, the turbine casing including an upper casing and a lower casing configured to collectively surround a rotor, the rotor having a rotor axis, the method comprising: for at least one primary axial location along the rotor axis and at one or both sides of the turbine casing at each primary axial location: with the upper casing coupled to the lower casing in a top-on position, measuring: a first location of a first reference point at a first optical target coupled to an outer surface of a horizontal joint (HJ) flange of the lower casing, and a second location of a second reference point at a second optical target coupled to the outer surface of the HJ flange of the lower casing and vertically spaced from the first optical target; with at least the upper casing removed from the lower casing in a top-off position, measuring: a third location of the first reference point at the first optical target, a fourth location of the second reference point at the second optical target, a fifth location of a third reference point on an upper surface of the horizontal joint (HJ) flange of the lower casing, the third reference point having a known spatial relation to a component support position of the component in the lower casing at the respective primary axial location, and a sixth location of a fourth reference point on the upper surface of the HJ flange of the lower casing, the fourth reference point spaced from the third reference point on the upper surface of the HJ flange of the lower casing; calculating a prediction offset value for the component support position in the top-on position based on at least the first, second, third, fourth, fifth and sixth locations and an inner radius of the lower casing; and adjusting the component support position in the turbine casing by the prediction offset value, wherein an alignment of the component positioned at the component support position is improved relative to the rotor axis upon replacing the upper casing to the top-on position.

A second aspect of the disclosure provides a system for aligning a component within a turbine casing, the turbine casing including an upper casing and a lower casing configured to collectively surround a rotor, the rotor having a rotor axis, the system comprising: a measurement module configured to: for at least one primary axial location along the rotor axis and at one or both sides of the turbine casing at each primary axial location: with the upper casing coupled to the lower casing in a top-on position, receive a measurement of: a first location of a first reference point at a first optical target coupled to an outer surface of a horizontal joint (HJ) flange of the lower casing, and a second location of a second reference point at a second optical target coupled the outer surface of the HJ flange of the lower casing and vertically spaced from the first optical target; with at least the upper casing removed from the lower casing in a top-off position, receive a measurement of: a third location of the first reference point at the first optical target, a fourth location of the second reference point at the second optical target, a fifth location of a third reference point on an upper surface of the horizontal joint (HJ) flange of the lower casing, the third reference point having a known spatial relation to a component support position of the component in the lower casing at the respective primary axial location, and a sixth location of a fourth reference point on the upper surface of the HJ flange of the lower casing, the fourth reference point spaced from the third reference point on the upper surface of the HJ flange of the lower casing; and a calculation module configured to: calculate a prediction offset value for the component support position in the top-on position based on at least the first, second, third, fourth, fifth and sixth locations and an inner radius of the lower casing, and indicate an adjustment for the component support position in the turbine casing at the at least one primary axial location based on the prediction offset value.

A third aspect includes a turbine casing, comprising: an upper casing having an upper horizontal joint (HJ) flange; a lower casing having a lower horizontal joint (HJ) flange, wherein the upper casing and the lower casing are configured to collectively surround a turbine rotor and a plurality of turbine blades coupled to the turbine rotor; and a plurality of first optical targets, each first optical target positioned at one of a plurality axial locations extending along a radially facing outer surface of the lower HJ flange of the lower casing.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE DISCLOSURE

Figure 1:
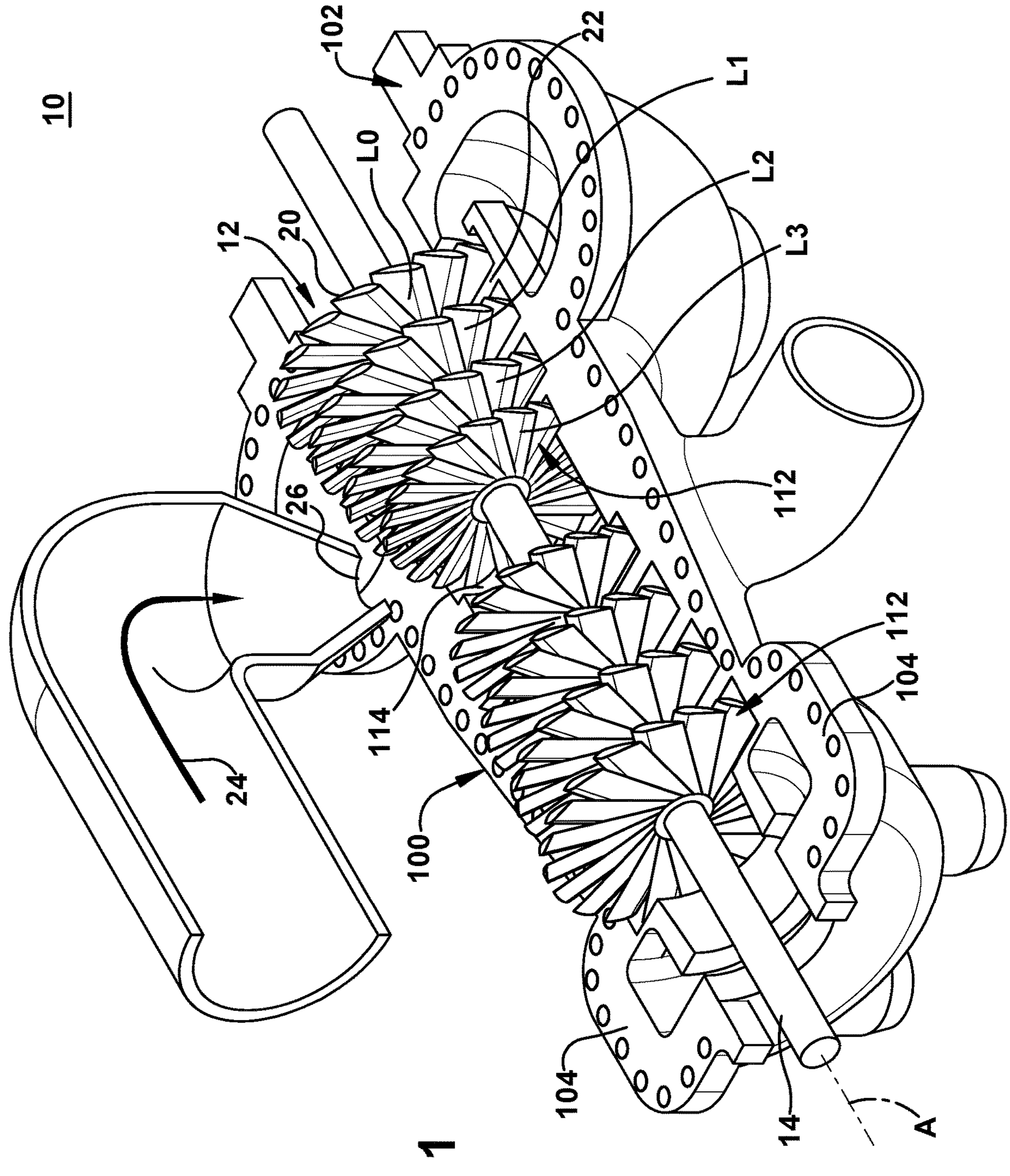
FIG. 1 shows a perspective partial cut-away illustration of a steam turbine with an upper casing removed.

As an initial matter, in order to clearly describe the current disclosure it will become necessary to select certain terminology when referring to and describing relevant machine components within a turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine system or, for example, the flow of air through the combustor or coolant through one of the turbine system's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., the turbine rotor axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a method and system for aligning a component within a turbine casing, and a related turbine casing. In a top-on position, a location of the optical target and another, vertically spaced optical target on a horizontal joint (HJ) flange of the lower casing are measured at one or more primary axial locations. After removing at least the upper casing, the optical targets' locations are measured again, and the locations of a pair of reference points on an upper surface of the HJ flange, are measured. A prediction offset value is calculated for the component support position in the top-on position based on at least the measured locations. The prediction offset value may include a number of calculated adjustments. In one example, a tilt angle of the lower casing and a rotation angle of the lower casing can be calculated, and a vertical adjustment made based on both. In another example, a horizontal adjustment can be calculated based on the horizontal shift of the lower casing from the top-on to the top-off position. In another example, an HJ flange surface distortion can be identified by superimposing reference lines of the HJ flange surfaces and identifying any gaps at an inner or outer location of mating of the surfaces with the prediction offset value including a correction based on the surface distortion. Similar prediction offset values can be calculated for other secondary axial locations that include only one optical target. In any event, the component support position at a variety of axial locations may be adjusted by the prediction offset value to improve alignment at each axial location. The method and system reduce the lifting required and can address practically all of the alignment issues.

A. Turbine System and Turbine Casing

Referring to the drawings, FIG. 1 shows a perspective partial cut-away illustration of an illustrative turbine system in the form of a steam turbine (ST) system 10. ST system 10 includes a rotor 12 that includes a turbine rotor 14 and a plurality of axially spaced rotor wheels 18. Turbine rotor 14 has a rotor axis A. A plurality of rotating turbine blades 20 are mechanically coupled to each rotor wheel 18. More specifically, turbine blades 20 are arranged in rows that extend circumferentially around each rotor wheel 18. A plurality of stationary vanes 22 extends circumferentially around turbine rotor 14, and the vanes are axially positioned between adjacent rows of turbine blades 20. Stationary vanes 22 cooperate with turbine blades 20 to form a stage and to define a portion of a steam flow path through ST system 10. In one embodiment of the present disclosure, as shown in FIG. 1, ST system 10 comprises five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine system may have more or less than five stages. Also, as will be described herein, the teachings of the disclosure do not require a multiple stage turbine.

In operation, a working fluid, here steam, 24 enters an inlet 26 of ST system 10 and is channeled through stationary vanes 22. Vanes 22 direct steam 24 downstream against turbine blades 20. Steam 24 passes through the remaining stages imparting a force on turbine blades 20 causing turbine rotor 14 to rotate. At least one end of ST system 10 may extend axially away from rotor 12 and may be attached to a load or machinery (not shown) such as, but not limited to, a generator, and/or another turbine.

While embodiments of the disclosure will be described relative to ST system 10, it will be readily understood that the teachings of the disclosure are applicable to a variety of turbine systems and/or other industrial machines having heavy mating casings or parts that require component alignment.

Figure 2:
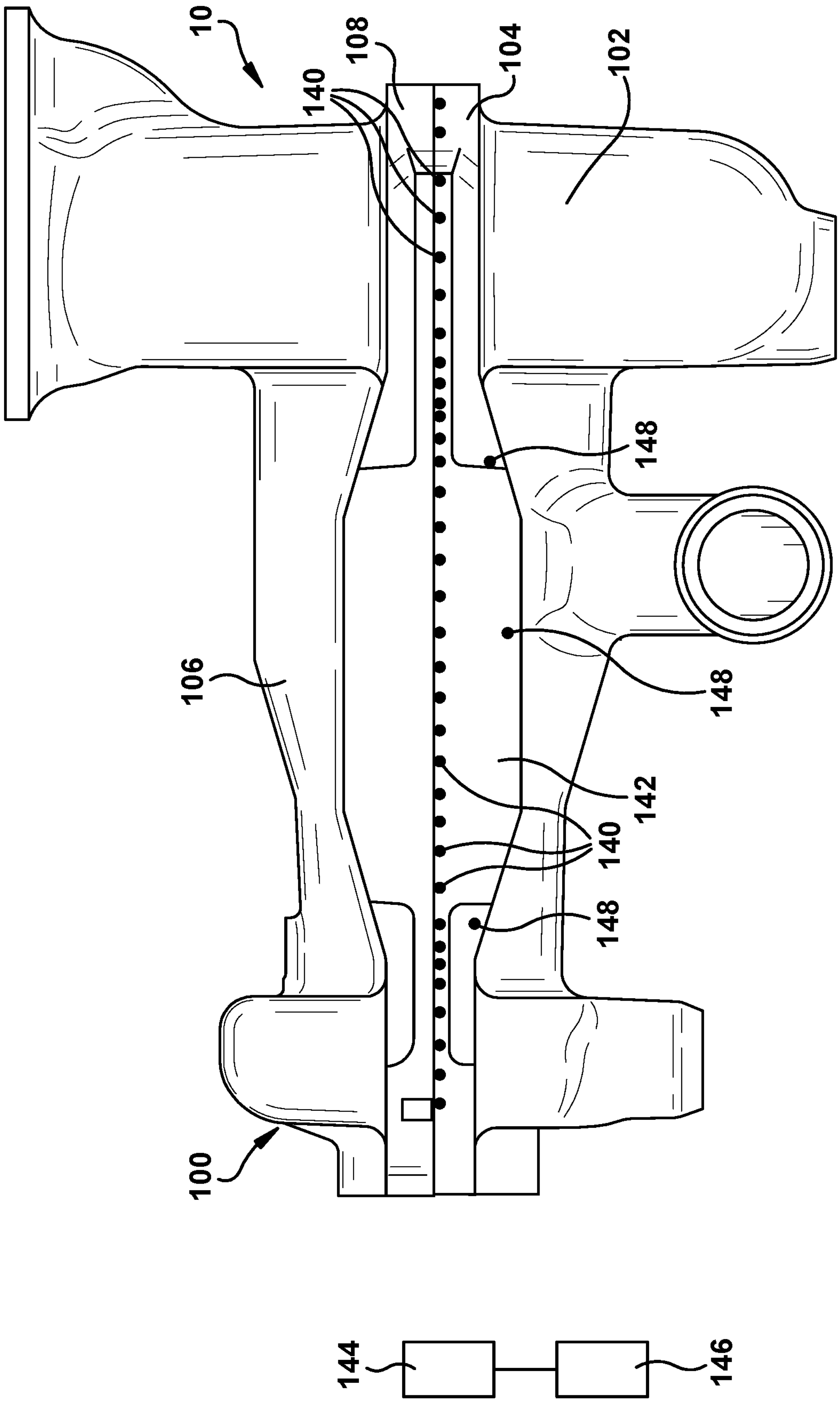
FIG. 2 shows a side view of a turbine casing according to embodiments of the disclosure.

As shown in a side perspective view of FIG. 2, ST system 10 may include a turbine casing 100 including a lower casing 102 having a lower horizontal joint (HJ) flange 104, and an upper casing 106 having an upper horizontal joint (HJ) flange 108. (Note, FIG. 2 shows ST system 10 with any insulation and much of its piping removed.) Lower and upper casings 102, 106 may each represent any degree of a 360° casing that collectively surround turbine rotor 14. That is, upper casing(s) 106 and lower casing(s) 102 are collectively configured to surround turbine rotor 14 (FIG. 1) and turbine blades 20 (FIG. 1) coupled to the turbine rotor. The disclosure will be described relative to a single upper casing 106 and single lower casing 102, it will be appreciated by those with skill in the art that the teachings are applicable to turbine systems having numerous upper and/or lower casings. In any event, upper casing 106 and lower casing 102 are configured to collectively surround turbine rotor 14 and turbine blades 20 coupled to turbine rotor 14. Upper casing 106 and lower casing 102 can be attached, for example, by fasteners, at respective HJ flanges 104, 108. HJ flanges 104, 108 extend radially outward from rounded portions of casings 102, 106 to create connection flanges. While named "horizontal joint" flanges, as understood in the art, the HJ flanges 104, 108 may diverge from horizontal. Each casing 102, 106 has an inner radius (IR) (FIG. 4) used for operations according to embodiments of the disclosure. Inner radius (IR) may vary depending on the prediction offset value being calculated. For example, inner radius (IR) may be from rotor axis A to an inner surface of each casing 102, 106, from rotor axis A to an outer surface of component 120, or from rotor axis to some part of a relevant component support position 124.

Typically, upper casing 106 is removed during maintenance to expose turbine rotor 14 and internal components of ST system 10. Upper casing 106 can be removed by removing any insulation and external piping (not shown), removing fasteners to lower casing 102, and lifting it away with a crane, e.g., a heavy lift crane. Components within lower casing 102 can then be serviced. In many instances, the components may also be removed, serviced and replaced, requiring alignment thereof relative to casings 102, 106 prior to re-use. Components that may require alignment upon replacement of upper casing 106 may include, for example, a diaphragm portion 112 (FIG. 1), an inner casing portion 114 (FIG. 1) and one or more stationary nozzle portions 116 (FIG. 1). It is understood that the prior list of components is not comprehensive and a wide variety of components may require alignment.

Figure 3:
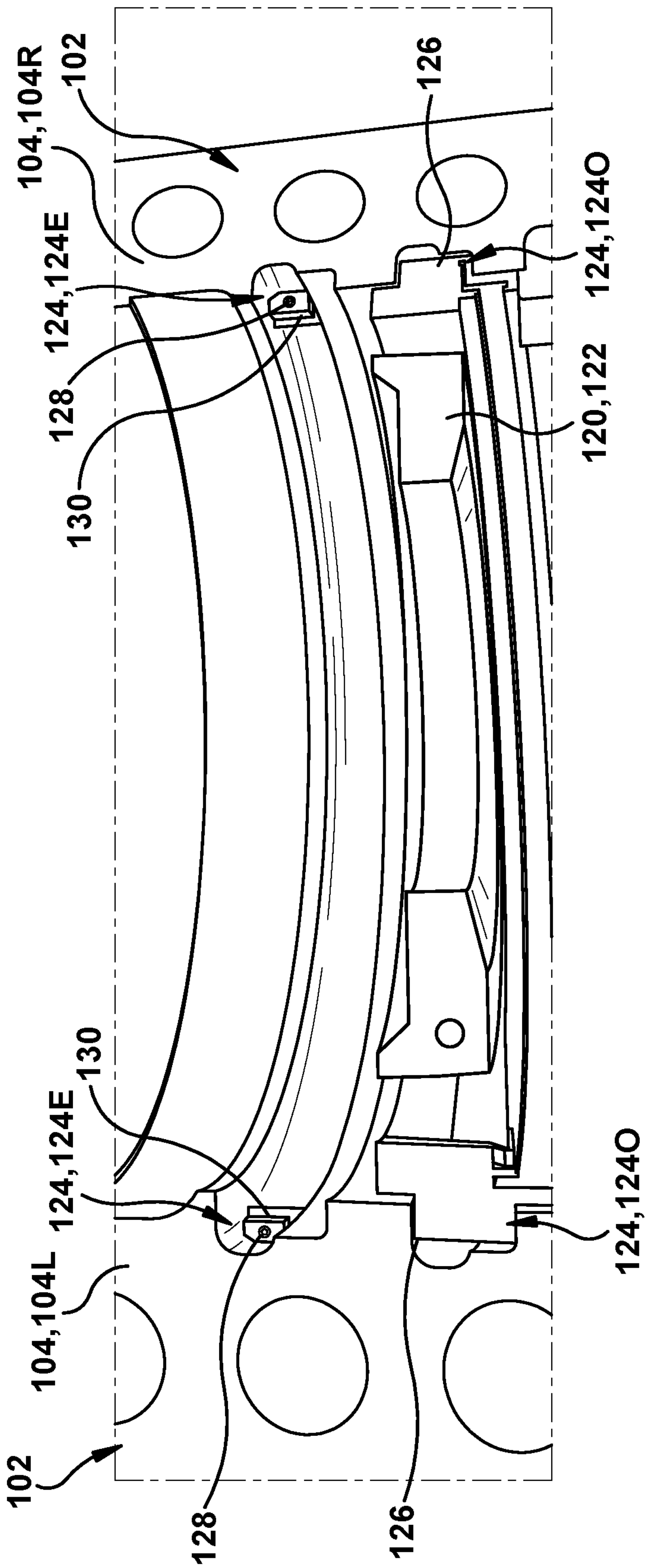
FIG. 3 shows a top down view of a component support position in a lower casing in a top-off position, according to embodiments of the disclosure.
Figure 4:
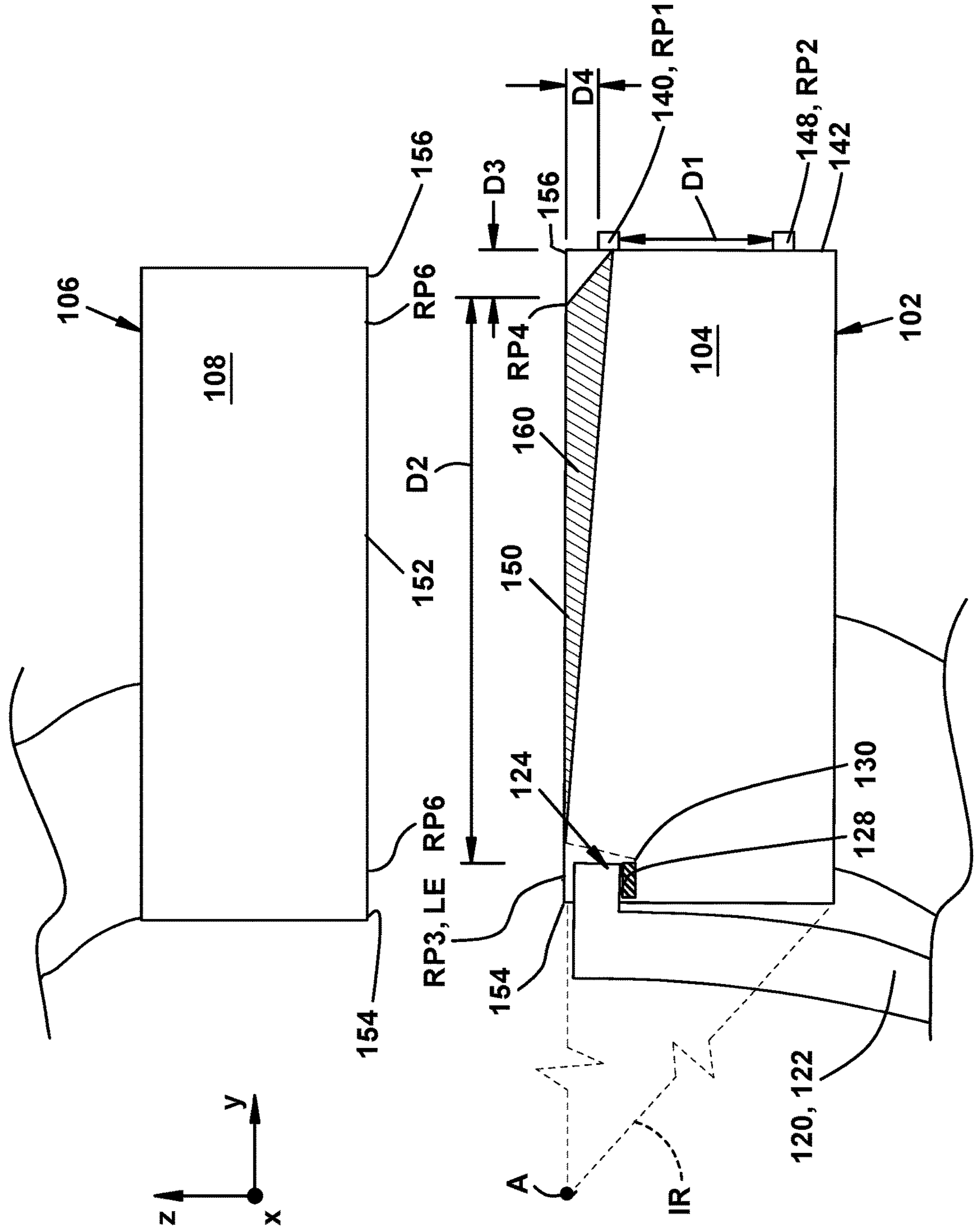
FIG. 4 shows a partial cross-sectional view of a component in a component support position in a lower casing in a top-off position, according to embodiments of the disclosure.

FIG. 3 shows a top down view in a top-off position of an illustrative component 120 in the form of a diaphragm 122. FIG. 3 shows an occupied diaphragm support position 1240 having a diaphragm 122 therein; and a component (diaphragm) support position 124E emptied of a respective diaphragm. FIG. 4 shows a partial cross-sectional view of an illustrative diaphragm 122 (shown transparent) in a component support position 124 in one side of lower casing 102. As understood, any number of diaphragms 122 are axially spaced within casings 102, 106 and extend within an inner radius of each casing 102, 106 to interact with turbine blades 20 (FIG. 1). Diaphragms 122 of lower casing 102 and upper casing 106 (not shown) mate at their respective circumferential ends 132 (FIG. 4) to create a working fluid path with turbine blades 20 (FIG. 1). As illustrated, each diaphragm 122 has an extension 126 at circumferential ends 132 (FIG. 4) thereof that is supported by component support position 124. In the example shown, component support position 124 may include a shim 128 fastened to a ledge 130 (FIG. 4 only). More particularly, component support position 124 may include ledge 130 (FIG. 4 only) on an inner radius of lower casing 102, and shim 128 may be positioned thereon to support extension 126 of diaphragm 122. Shim 128 and/or ledge 130 can be adjusted to align diaphragm 122 relative to turbine casing 100, e.g., after service of ST system 10 (FIG. 1). For example, shim 128 can be adjusted by increasing or decreasing its height relative to ledge 130 to adjust a vertical height of component 120, i.e., to raise or lower diaphragm 122. In addition or alternatively, shim 128 can be adjusted to change an angle (α) of an upper surface 136 thereof. In addition or alternatively, edge 130 can be adjusted similarly to shim 128. While component 120 has been illustrated and described herein as a diaphragm 122, it is understood that the teachings of the disclosure are applicable to a wide variety of alternative components 120 within turbine casing 100. For example, as noted, component 120 may include at least one of a diaphragm portion 112 (FIG. 1) (of diaphragm 122), an inner casing portion 114 (FIG. 1) and one or more stationary nozzle portions 116 (FIG. 1). Further, while component support position 124 has been described as a ledge and shim arrangement, it is understood that a shim 128 may not be necessary, and ledge 130 could be adjusted alone. Further, it is emphasized that component support position 124 may take a variety of alternative forms other than a ledge and shim arrangement, and may include any form of support for a component 120. Component support position 124 may also be located at a different location than indicated in FIGS. 3-4, depending on the component. The component support position can also be directly on HJ flange 104, 108. The adjustment may be made by means of an adjusting screw or bolt.

In accordance with embodiments of the disclosure, parts of turbine casing 100 can be provided with a number of selected reference points (RP) that can be used to calculate a prediction offset value that can be employed to adjust a component support position 124 to improve alignment of component 120 positioned at component support position 124 relative to rotor axis A upon replacing upper casing 106 to the top-on position.

As shown in FIGS. 2 and 4, turbine casing 100 may include a plurality of first optical targets 140. Each first optical target 140 is positioned at one of a plurality of axial locations relative to a radially facing outer surface 142 of lower HJ flange 104 of lower casing 102. In certain embodiments, first optical targets 140 are coupled to radially facing outer surface 142 of lower HJ flange 104; however, other locations on an outer surface of lower casing 102 may be possible. Each first optical target 140 may include any now known or later developed optical target capable of detection using an appropriate measurement system. In one non-limited example, first optical target(s) 140 may include a spherically mounted retroreflector (SMR) adapter coupled to radially facing outer surface 142 of lower HJ flange 104 of lower casing 102. First optical target(s) 140 may be coupled to radially facing outer surface 142 in any now known or later developed manner, e.g., welding, fasteners, etc. In one example, a measurement system 144 for measuring a location of optical target(s) 140 may include, for example, a laser measurement system such as a Vantage model laser tracker available from FARO Corp. of Lake Mary, FL, or a model AT401 laser tracker available from Leica Geosystems Inc. of Norcross, GA. Measurement system 144 may be operatively coupled to an alignment system 146, described herein. While a laser measurement system has been listed herein as an example, it is understood that wide variety of alternative measurement systems are available that are capable of the locating a reference point in three-dimensional space. Measurement system 144 may include but is not limited to: infrared, radar, etc.

For purposes that will be described herein, turbine casing 100 may also include a second optical target 148 positioned at one or more of axial locations with first optical targets 140. Axial locations that include both optical targets 140, 148 are referred to hereafter as “primary axial locations,” while those with only first optical target 140 are referred to hereafter as “secondary axial locations.” As shown best in FIG. 4, each second optical target 148 is vertically spaced from a respective first optical target 140, e.g., on radial facing outer surface 142 of lower HJ flange 104, by a distance D1. This vertical spacing D1 may vary depending on, for example, the size of lower HJ flange 104. The vertical spacing D1 is predefined such that a spatial relationship between optical targets 140, 148 at the selected primary axial locations is known. In one non-limited example, second optical targets 148 may also include an SMR adapter coupled to an outer surface of lower HJ flange 104 of lower casing 102. Second optical target(s) 148 may be coupled to the outer surface in any now known or later developed manner, e.g., welding, fasteners, etc. In certain embodiments, second optical targets 148 are coupled to radially facing outer surface 142 of lower HJ flange 104; however, other locations on an outer surface of lower casing 102 may be possible. In the example shown, three second optical targets 148 are shown, resulting in three primary axial locations, but any number may be employed. As illustrated, first optical targets 140 alone may also be positioned on lower HJ flange 104 at a number of secondary axial locations at which no second optical target 148 is present. If reference is made to simply “axial location” it refers to any axial location—primary and/or secondary axial locations, or other axial locations. The purposes of optical targets 140, 148 and the primary and secondary axial locations will be described herein.

FIG. 4 shows a number of reference points that can be used to identify issues that can impact any necessary adjustment to component support position 124. The locations of the reference points relative to lower HJ flange 104 and/or upper HJ flange 108 may be predefined based on the geometry at the desired axial location of lower casing 102, and can be measured by measurement system 144 according to embodiments of the disclosure. As will be described, the locations can be used by alignment system 146 to calculate a prediction offset value for one or more component support positions 124 in the top-on position. Adjusting component support position 124 in turbine casing 100 (FIG. 2) by the prediction offset value improves an alignment of component 120 (FIG. 3) positioned at component support position 124 relative to rotor axis A upon replacing upper casing 106 to the top-on position. In the disclosure, a ‘reference point’ indicates a fixed position on the upper or lower casing, e.g., of an optical target or other selected position, while a ‘location of a reference point X’ indicates a changeable, three dimensional position of a reference point X, e.g., as measured by measurement system 144. The locations will be numbered, i.e., first, second, third, etc., for differentiation purposes. Note, each reference point may have a number of locations. In any event, locations may be indicated by any now known or later developed three dimensional coordinate system, e.g., using measurement system 144 as an origin. Measurement system 144, as noted, may include any appropriate measurement system for measuring locations of reference points on casings 102, 106, e.g., using lasers. Alignment system 146 may receive the locations of the reference points at measurement module 230 (FIG. 12) where calculation module 232 (FIG. 12) calculates the prediction offset value.

Figure 22:
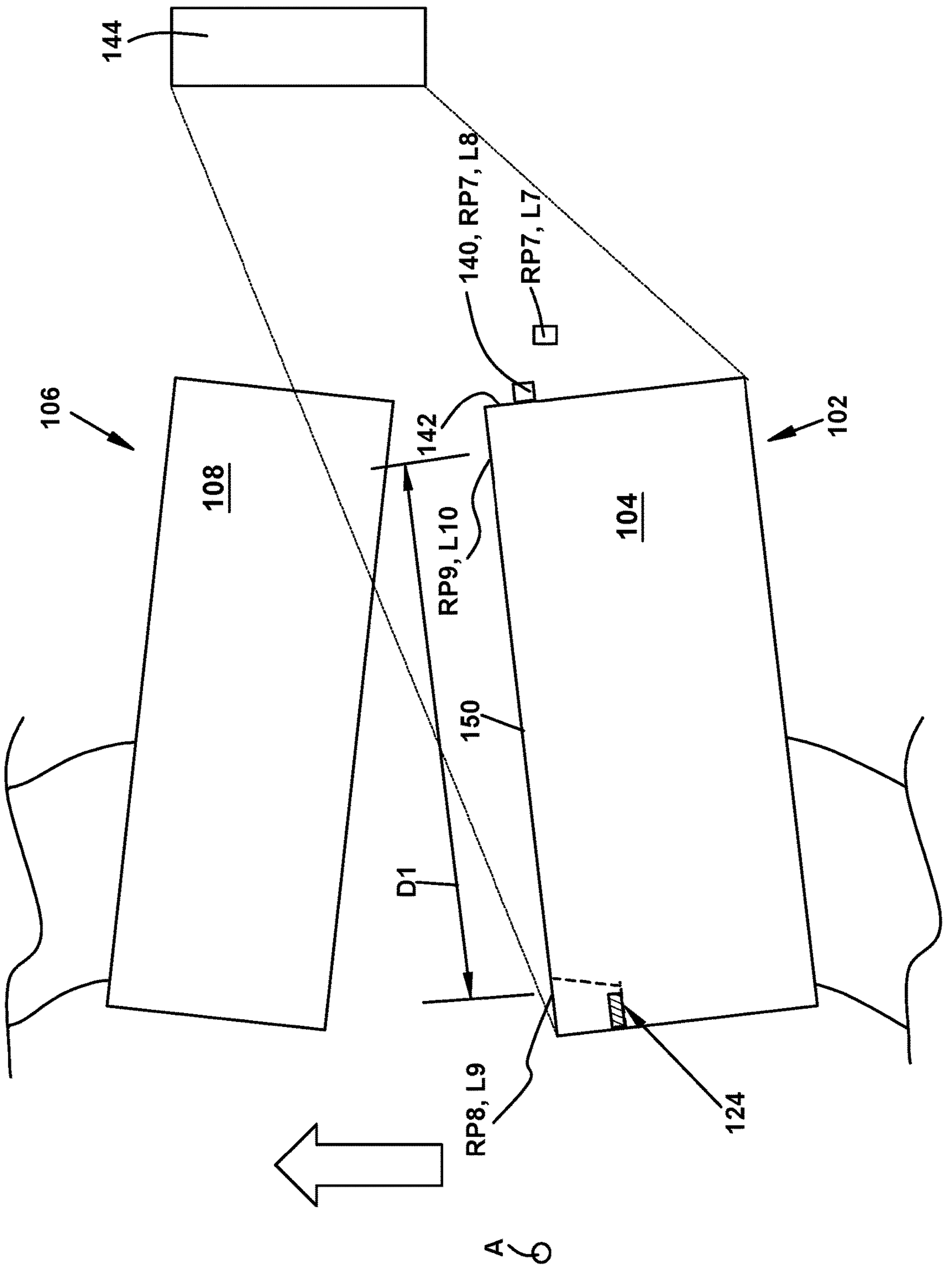
FIG. 22 shows a schematic cross-sectional view of HJ flanges of a turbine casing at a secondary axial location in a top-off position, according to embodiments of the disclosure.

As shown in FIG. 4, the following illustrative reference points may be defined at each selected primary axial location: a first reference point RP1 at first optical target 140 coupled to an outer surface 142 (FIG. 2) of lower HJ flange 104; a second reference point RP2 at second optical target 148 coupled to outer surface 142 (FIG. 2) of lower HJ flange 104 and vertically spaced from first optical target 140 (FIG. 2); a third reference point RP3 on upper surface 150; and a fourth reference point RP4 on upper surface 150. As will be described, upper casing 106 may include a number of reference points thereon including, for example, a fifth reference point RP5 on a lower (as drawn) surface 152 of upper HJ flange 108 and a sixth reference point RP6 on lower surface 152 of upper HJ flange 108. In addition, secondary axial locations may also include reference points. As noted, secondary axial locations do not include second optical target 148 coupled to outer surface 142 (FIG. 2) of lower HJ flange 104. As shown in FIG. 22, secondary axial locations may include seventh, eighth and ninth reference points RP7, RP8 and RP9. As will be further described, seventh, eighth and ninth reference points RP7, RP8 and RP9 correspond in function to first, third and fourth reference points (RP1, RP3, RP4) at primary axial locations.

In accordance with embodiments of the disclosure, at least one of the reference points has a known spatial relationship to component support position 124 such that a change in position of the reference point, i.e., as calculated in the form of the prediction offset value, can be used to adjust component support position 124 to provide the necessary change in position to component 120 (FIGS. 3 and 15) to ensure alignment thereof in the top-on position. In the example shown, third reference point RP3 has a known spatial relationship with component support position 124, e.g., ledge 130 and/or shim 128. The spatial relationship may be in any form. That is, a direct relationship in which third reference point RP3 may have a defined vertical and/or radial offset from component support position 124, and/or an indirect relationship in which third reference point RP3 and component support position 124 each having a known relationship to another point, e.g., inner edge 154 of lower casing 102. In any event, the spatial relationship can be used to calculate changes for component support position 124. At secondary axial locations, seventh reference point RP7 (FIG. 22) may provide the same function as third reference point RP3 for primary axial locations, i.e., it has a known spatial relationship with component support position 124 at the respective secondary axial location.

Figure 14:
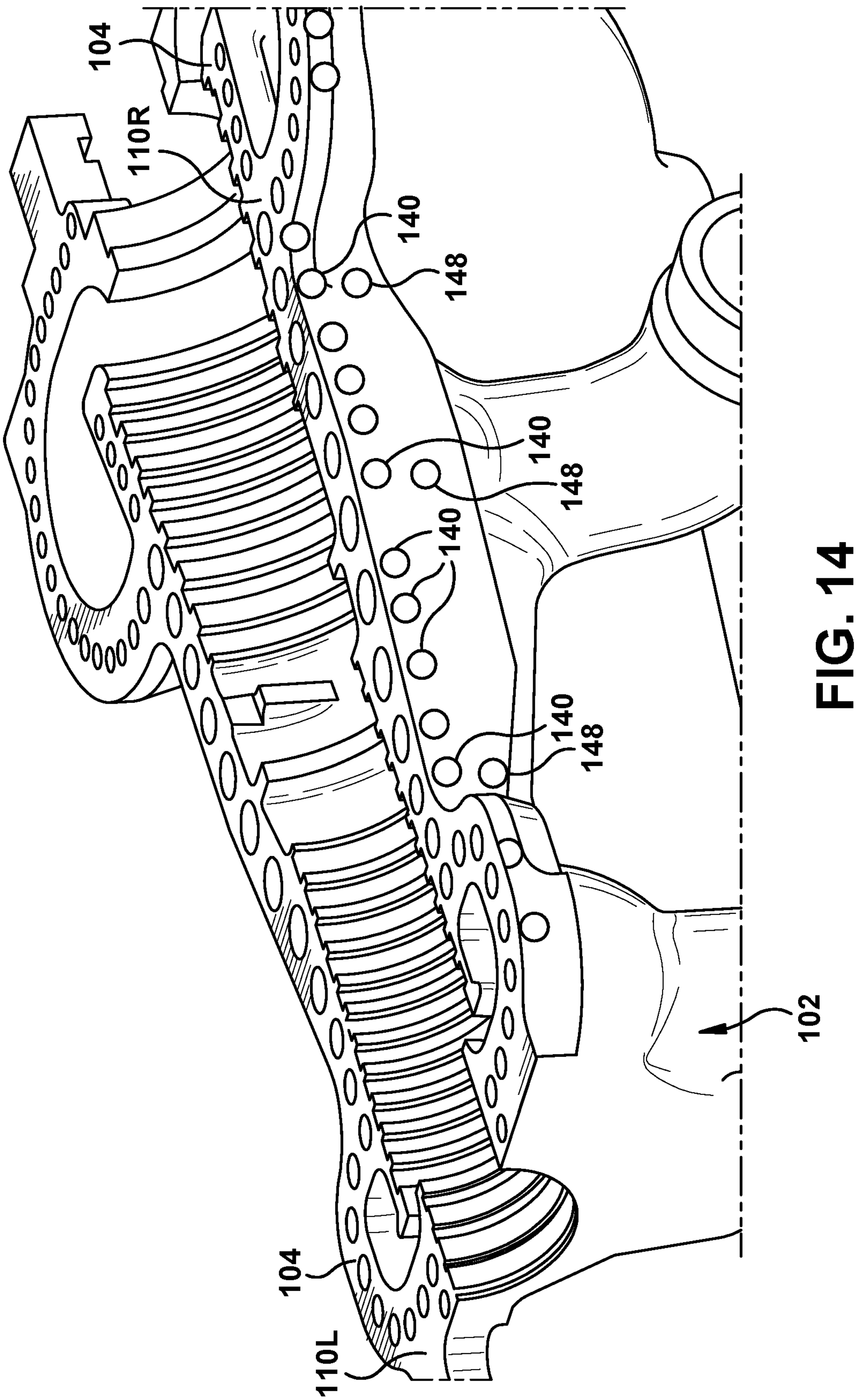
FIG. 14 shows a perspective view of a lower casing in a top-off position, according to embodiments of the disclosure.

As observed in FIG. 4, spatial relationships between the reference points can be defined based on the known (expected) geometry of lower HJ flange 104 at each axial location. That is, the reference points can be used to define an expected spatial relationship for each axial location as lower HJ flange 104 and/or upper HJ flange 108 changes along axial cross-sections. For example, distance D1 between first and second reference points RP1, RP2 is defined. In addition, each axial location may have a different third reference point RP3 and fourth reference point RP4 and/or fifth reference point RP5 and sixth reference point RP6 that are selected, for example, to avoid structure at a given axial location, e.g., cooling channels as shown in FIG. 14. Regardless, each set of third and fourth reference points RP3, RP4 and each set of fifth reference points RP5, RP6 may have defined spatial relationships with each other and other reference points, which can be verified through measurement in the top-off position. For example, a defined distance D2 between third and fourth reference points RP3 and RP4 (and RP5 and RP6) is defined and can be more precisely verified by measurement for each axial location. Further, fourth reference point RP4 may be a defined distance D3 from outer edge 156 of lower HJ flange 104, and first reference point RP1 (i.e., first optical target 140) may be a defined distance D4 from outer edge 156 of lower HJ flange 104. As a result, a triangular spatial relationship 160 (see differently shaded triangle in FIG. 4) between first reference point RP1, third reference point RP3 and fourth reference point RP4, is known and can be verified through measurement. Fifth location L5 of third reference point RP3 on upper surface 150 of lower HJ flange 104, sixth location L6 of fourth reference point RP4 on upper surface 150 of lower HJ flange 104, and third location L3 of first reference point RP1 at first optical target 140 in the top-off position, may be measured at a selected axial location to identify (verify) triangular spatial relationship 160. Consequently, as will be described, differences between an actual location of third reference point RP3 as measured in the top-off position and a predicted top-on location thereof based on a translation of triangular spatial relationship 160 to the top-on position (i.e., based on a location of the first reference point RP1 in the top-on position), can be used to calculate at least one form of the prediction offset value. Similar relationships exist for seventh, eighth, and ninth reference points RP7, RP8 and RP9 (FIG. 22) at secondary axial locations.

As noted, FIG. 4 also shows upper casing 106 with a number of reference points thereon (internal components not shown for upper casing 106). For example, upper casing 106 may include fifth reference point RP5 on lower (as drawn) surface 152 of upper HJ flange 108 and sixth reference point RP6 on lower surface 152 of upper HJ flange 108. In a top-on position, fifth reference point RP5 is aligned with third reference point RP3, and sixth reference point RP6 is aligned with fourth reference point RP4. Therefore, fifth and sixth reference points RP5 and RP6 may be distance D2 apart. Fifth and sixth reference points RP5 and RP6 locations may also be known relative to edges of upper HJ flange 108.

Reference points can be defined relative to casings 102, 106 by optical targets 140, 148, or by any other mechanism by which measurement system 144 can measure their location, e.g., marks or objects on a surface detectable by measurement system 144, temporary measurement targets placed at the reference point (e.g., optical target, reflective tape, scribe marks, stamped marks, etc.), etc.

B. Possible Casing Issues

FIGS. 5-11 show schematic cross-sectional views of possible HJ flange 104, 108 scenarios that may occur during a maintenance operation in which upper casing 106 is removed from lower casing 102, i.e., to a top-off position. The scenarios illustrated can occur at any axial location, and at one or both sides of lower casing 102. Each scenario may impact alignment of components 120 (FIG. 3) within turbine casing 100 differently, and can be addressed according to the methodology described herein. For purposes of description, FIGS. 5-11 illustrate HJ flanges 104, 108 from a perspective in which turbine rotor axis A is to the left of the side shown. As will be described, rotor axis A acts as a coordinate system origin for the methodology described. For brevity, rotor axis A is only shown in FIG. 5; however, a reference line RL at which flanges 104, 108 could potentially meet has been provided. Most of the parts that curve away for casings 102, 106 have been omitted for clarity. It is appreciated that the diametrically opposing side of each casing 102, 106 from that shown may have similar, symmetrical positioning.

As understood the in the art, when HJ flanges 104, 108 are separated, lower casing 102 and lower HJ flange 104 may spring upwardly or bow, and upper casing 106 and upper HJ flange 108 may drop or spring downwardly. As this occurs, lower HJ flange 104 rotates about rotor axis A, changing vertical positioning. Further, lower HJ flange 104 may tilt inwardly, tilt outwardly or simply move vertically. Similarly, upper HJ flange 108 may tilt inwardly, tilt outwardly or simply move vertically. In addition, an upper surface 150 of lower HJ flange 104, and a lower surface 152 of upper HJ flange 108 may distort upon separation, i.e., the surfaces become non-planar. In this latter case, when casings 102, 106 are mated together again, surfaces 150, 152 may not meet in a surface-to-surface mating fashion, e.g., planar surface to planar surface, which may cause edges of casings 102, 106 to not close, creating a leak. While casings 102, 106 can be forcibly brought into planar engagement by way of fasteners that couple them together, the meeting of edges rather than surfaces, e.g., inner edges 154 or outer edges 156, may impact the alignment of component 120 (FIG. 3) inside the casings.

While FIGS. 5-11 show schematic cross-sectional views of possible HJ flange 104, 108 scenarios that may occur, they do not necessarily show the rotation of lower casing 102 about rotor axis A. Calculation of a prediction offset value (vertical adjustment) based on the rotation, among other things, will be illustrated elsewhere in the drawings.

Figure 5:
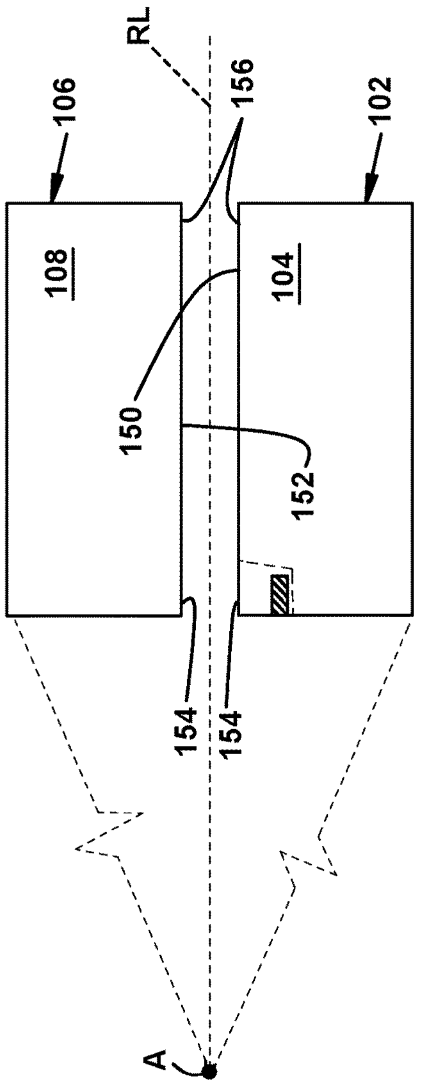
FIG. 5 shows a schematic cross-sectional view of a first scenario of horizontal joint (HJ) flanges of a turbine casing in a top-off position, according to embodiments of the disclosure.

FIG. 5 shows an illustrative scenario 1 in which both HJ flanges 104, 108 are parallel, i.e., surfaces 150, 152 thereof are parallel to one another and reference line (RL). If brought together, inner edges 154 would meet nearly simultaneously with outer edges 156, so the joint would not be open on either side. In this case, casings 102, 106 have not tilt, they simply separated from one another vertically.

Figure 6:
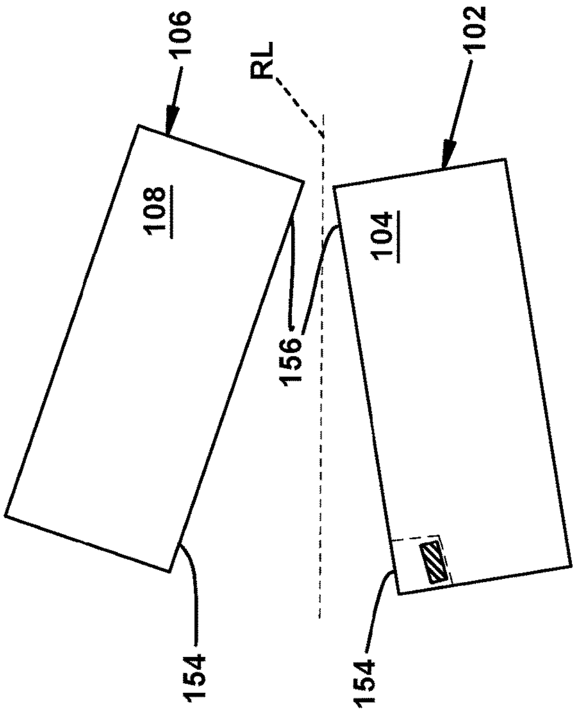
FIG. 6 shows a schematic cross-sectional view of a second scenario of HJ flanges of a turbine casing in a top-off position, according to embodiments of the disclosure.

FIG. 6 shows an illustrative scenario 2 in which HJ flanges 104, 108 are not parallel and have tilt such that, if brought together, inner edges 154 would be initially separated, and outer edges 156 would touch first, leaving the joint open on the inside (left side, as shown). In the scenario illustrated, lower HJ flange 104 tilt counterclockwise, and upper HJ flange 108 tilt clockwise.

Figure 7:
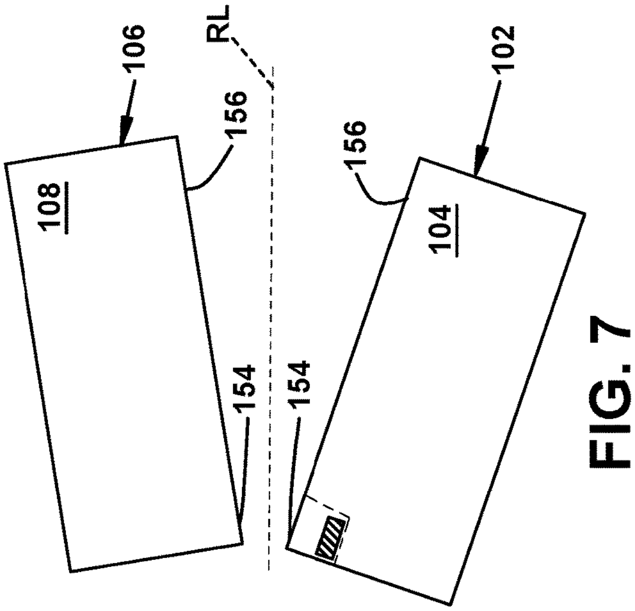
FIG. 7 shows a schematic cross-sectional view of a third scenario of HJ flanges of a turbine casing in a top-off position, according to embodiments of the disclosure.

FIG. 7 shows an illustrative scenario 3 in which both HJ flanges 104, 108 are not parallel and have tilt such that, if brought together, outer edges 156 would be initially separated, and inner edges 154 would touch first, leaving the joint open on the outside (right side, as shown). In the scenario illustrated, lower HJ flange 104 tilt clockwise, and upper HJ flange 108 tilt counterclockwise.

Figure 8:
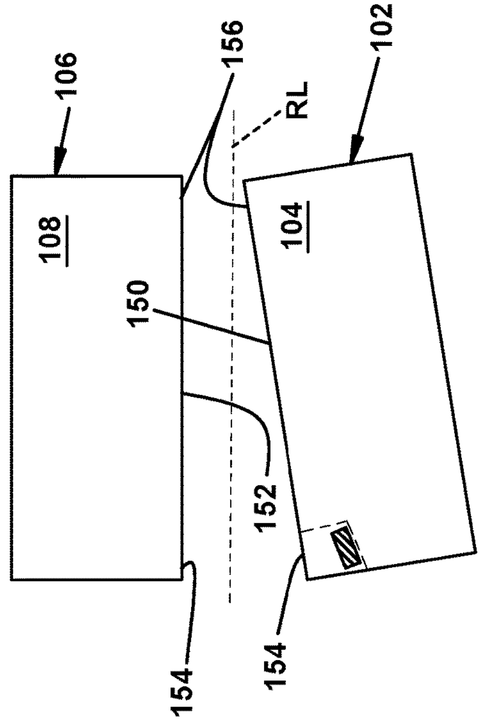
FIG. 8 shows a schematic cross-sectional view of a fourth scenario of HJ flanges of a turbine casing in a top-off position, according to embodiments of the disclosure.

FIG. 8 shows an illustrative scenario 4 in which HJ flange 104, 108 are not parallel and lower HJ flange 104 has tilt such that, if brought together, inner edges 154 would be initially separated, and outer edges 156 would touch first, leaving the joint open on the inside (left side, as shown). In the scenario illustrated, lower HJ flange 104 tilt counterclockwise, and upper HJ flange 108 did not tilt and remains parallel, e.g., to reference line RL.

Figure 9:
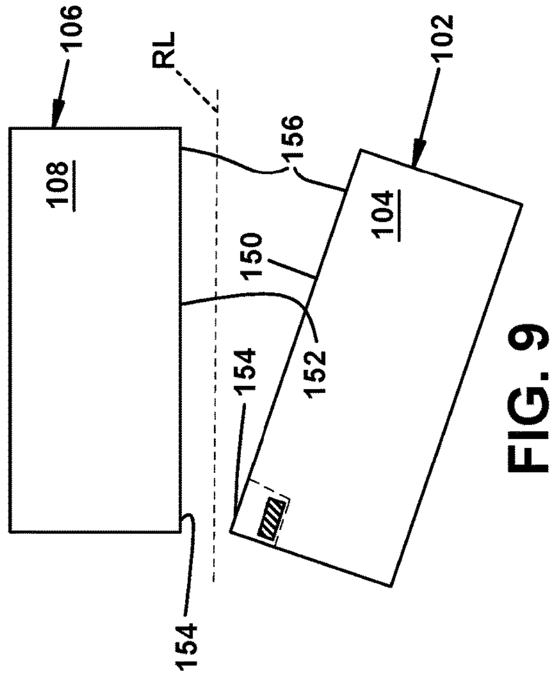
FIG. 9 shows a schematic cross-sectional view of a fifth scenario of HJ flanges of a turbine casing in a top-off position, according to embodiments of the disclosure.

FIG. 9 shows an illustrative scenario 5 in which HJ flanges 104, 108 are not parallel and lower HJ flange 104 has tilt such that, if brought together, inner edges 154 would be initially separated, and inner edges 154 would touch first, leaving the joint open on the outside (right side, as shown). In the setting illustrated, lower HJ flange 104 tilt clockwise, and upper HJ flange 108 did not tilt and remains parallel, e.g., to reference line RL.

Figure 10:
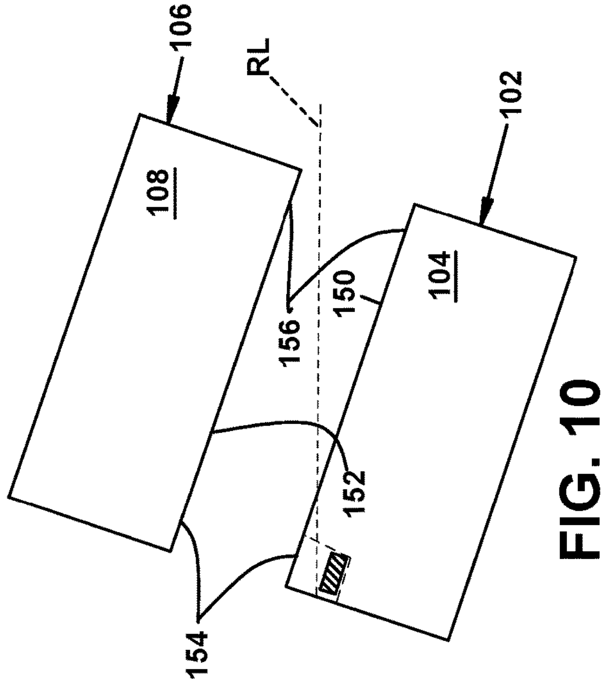
FIG. 10 shows a schematic cross-sectional view of a sixth scenario of HJ flanges of a turbine casing in a top-off position, according to embodiments of the disclosure.

FIG. 10 shows an illustrative scenario 6 in which both HJ flanges 104, 108 are parallel and both have tilt. Here, however, if brought together, inner edges 154 would meet nearly simultaneously with outer edges 156, so the joint would not be open on either side. In the scenario illustrated, lower HJ flange 104 tilt clockwise, and upper HJ flange 108 tilt clockwise.

Figure 11:
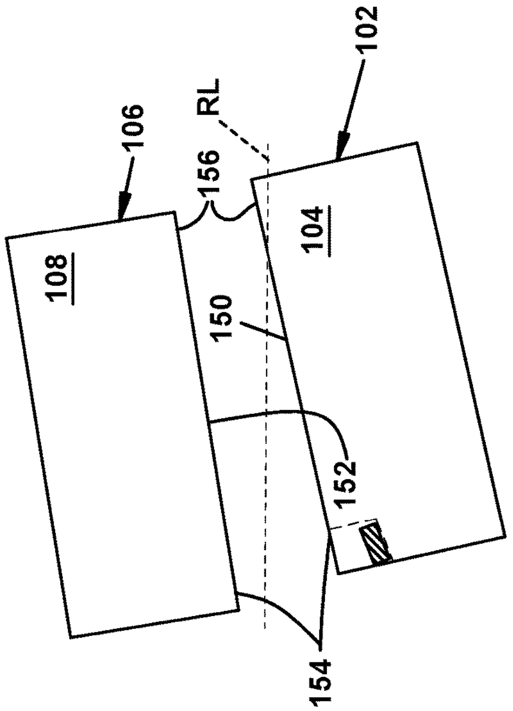
FIG. 11 shows a schematic cross-sectional view of a seventh scenario of HJ flanges of a turbine casing in the top-off position, according to embodiments of the disclosure.

FIG. 11 shows an illustrative scenario 7 in which both HJ flanges 104, 108 are parallel and both have tilt. Here, similar to FIG. 10, if brought together, inner edges 154 would meet nearly simultaneously with outer edges 156, so the joint would not be open on either side. In the scenario illustrated, lower HJ flange 104 tilt counterclockwise, and upper HJ flange 108 tilt counterclockwise.

Another issue that can occur in any of the previous scenarios is that surfaces 150, 152 may not be planar after casing 102, 106 separation. In this setting, inner edges 154 may not be in the same plane as outer edge 156, or other point(s) therebetween may make the surfaces non-planar.

C. Alignment System

Certain aspects of the disclosure may be embodied as an alignment system 146, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 12:
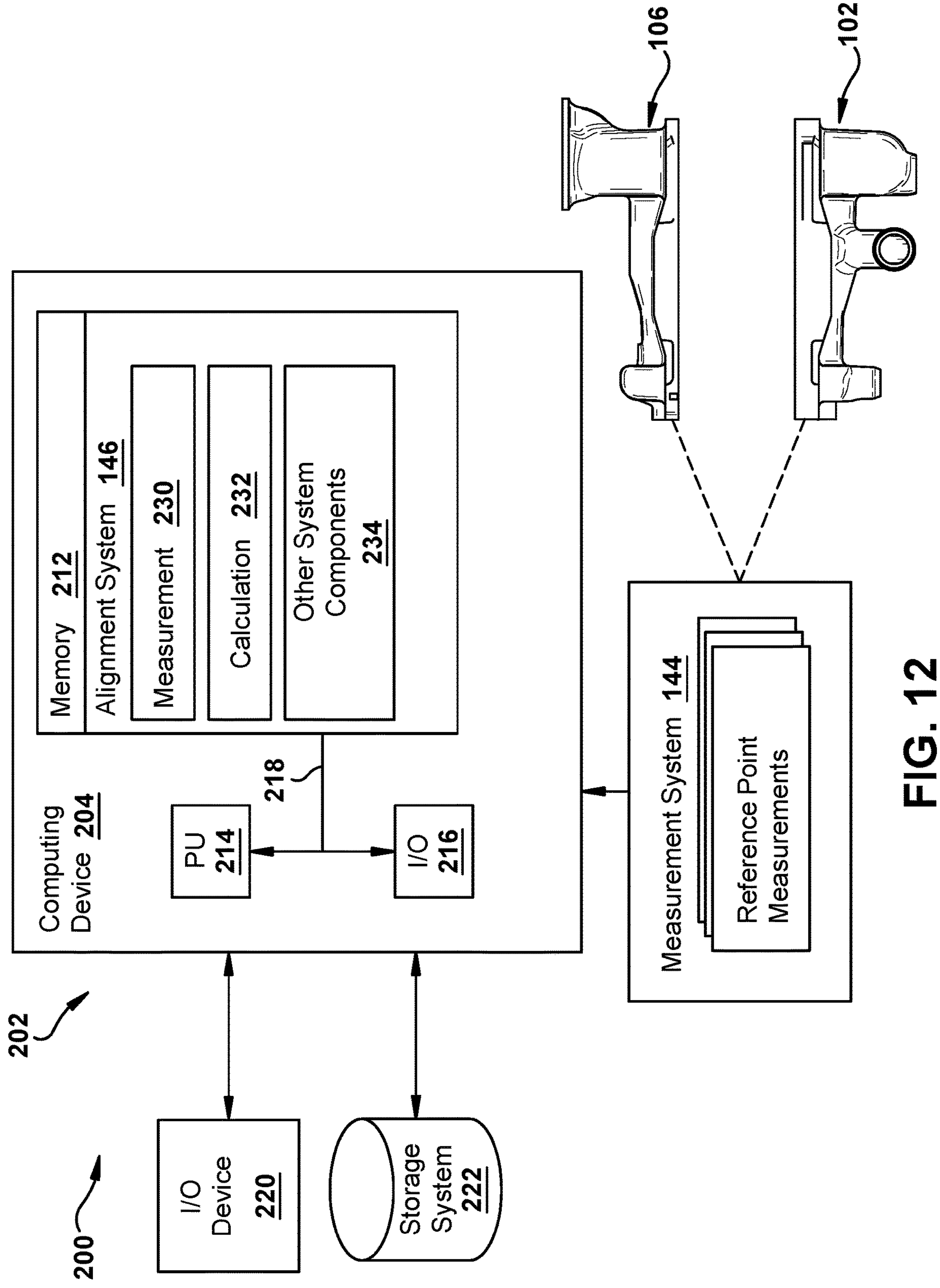
FIG. 12 shows a block diagram of an environment for an alignment system, according to embodiments of the disclosure.

FIG. 12 shows an illustrative environment 200 for alignment system 146. To this extent, environment 200 includes a computer infrastructure 202 that can perform the various process steps described herein for alignment system 146. In particular, computer infrastructure 202 is shown including a computing device 204 that comprises alignment system 146, which enables computing device 204 to receive measurements and calculate prediction offset value for adjustments for casings 102, 106, i.e., by performing the process steps of the disclosure.

Computing device 204 is shown including a memory 212, a processor (PU) 214, an input/output (I/O) interface 216, and a bus 218. Further, computing device 204 is shown in communication with an external I/O device/resource 220 and a storage system 222. As is known in the art, in general, processor 214 executes computer program code, such as alignment system 146, that is stored in memory 212 and/or storage system 222. While executing computer program code, processor 214 can read and/or write data, such as alignment system 146, to/from memory 212, storage system 222, and/or I/O interface 216. Bus 218 provides a communications link between each of the components in computing device 204. I/O device 216 can comprise any device that enables a user to interact with computing device 204 or any device that enables computing device 204 to communicate with one or more other computing devices. Input/output devices (including but not limited to keyboards, displays, pointing devices, etc.) can be coupled to the system either directly or through intervening I/O controllers.

In any event, computing device 204 can comprise any general purpose computing article of manufacture capable of executing computer program code installed by a user (e.g., a personal computer, server, handheld device, etc.). However, it is understood that computing device 204 and alignment system 146 are only representative of various possible equivalent computing devices that may perform the various process steps of the disclosure. To this extent, in other embodiments, computing device 204 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 202 is only illustrative of various types of computer infrastructures for implementing the disclosure. For example, in one embodiment, computer infrastructure 202 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, alignment system 146 enables computer infrastructure 202 to calculate prediction offset value(s) that can be used to make adjustments to improve alignment of components 120 (FIG. 4) within casings 102, 106 (FIG. 4). To this extent, alignment system 146 is shown including a measurement module 230, and a calculation module 232. Other system components 234 may also be provided. Operation of each of these systems is discussed further below. However, it is understood that some of the various systems shown in FIG. 12 can be implemented independently, combined, and/or stored in memory for one or more separate computing devices that are included in computer infrastructure 202. Further, it is understood that some of the systems and/or functionality may not be implemented, or additional systems and/or functionality may be included as part of environment 200.

Alignment system 146 may be geographically located on-site, local to turbine system 10, or it may be geographically remote from turbine system 10, e.g., in a centralized turbine system control center.

D. Operational Methodology

Figure 15:
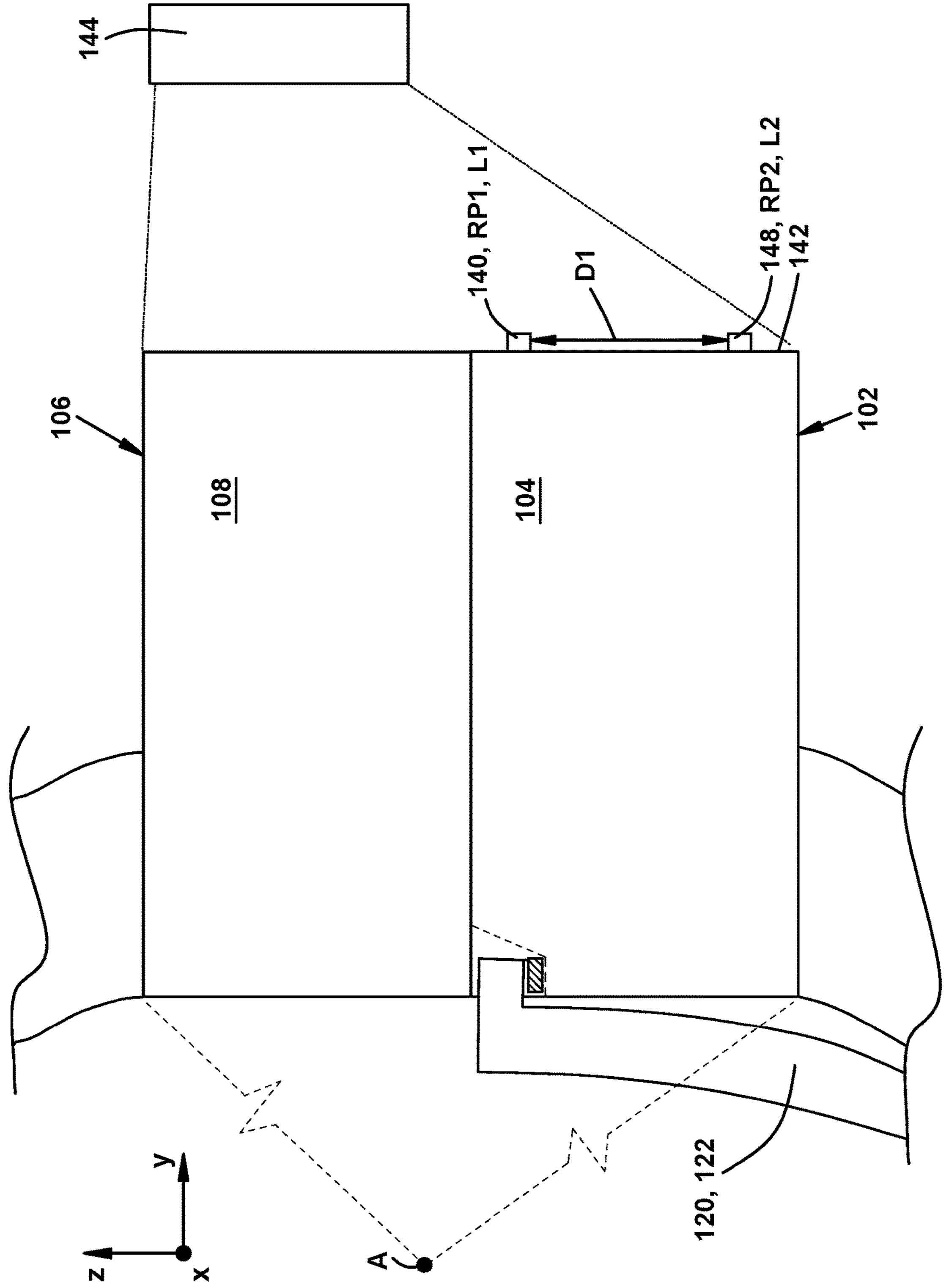
FIG. 15 shows a schematic cross-sectional view of HJ flanges of a turbine casing in a top-on position at a primary axial location, according to embodiments of the disclosure.
Figure 16:
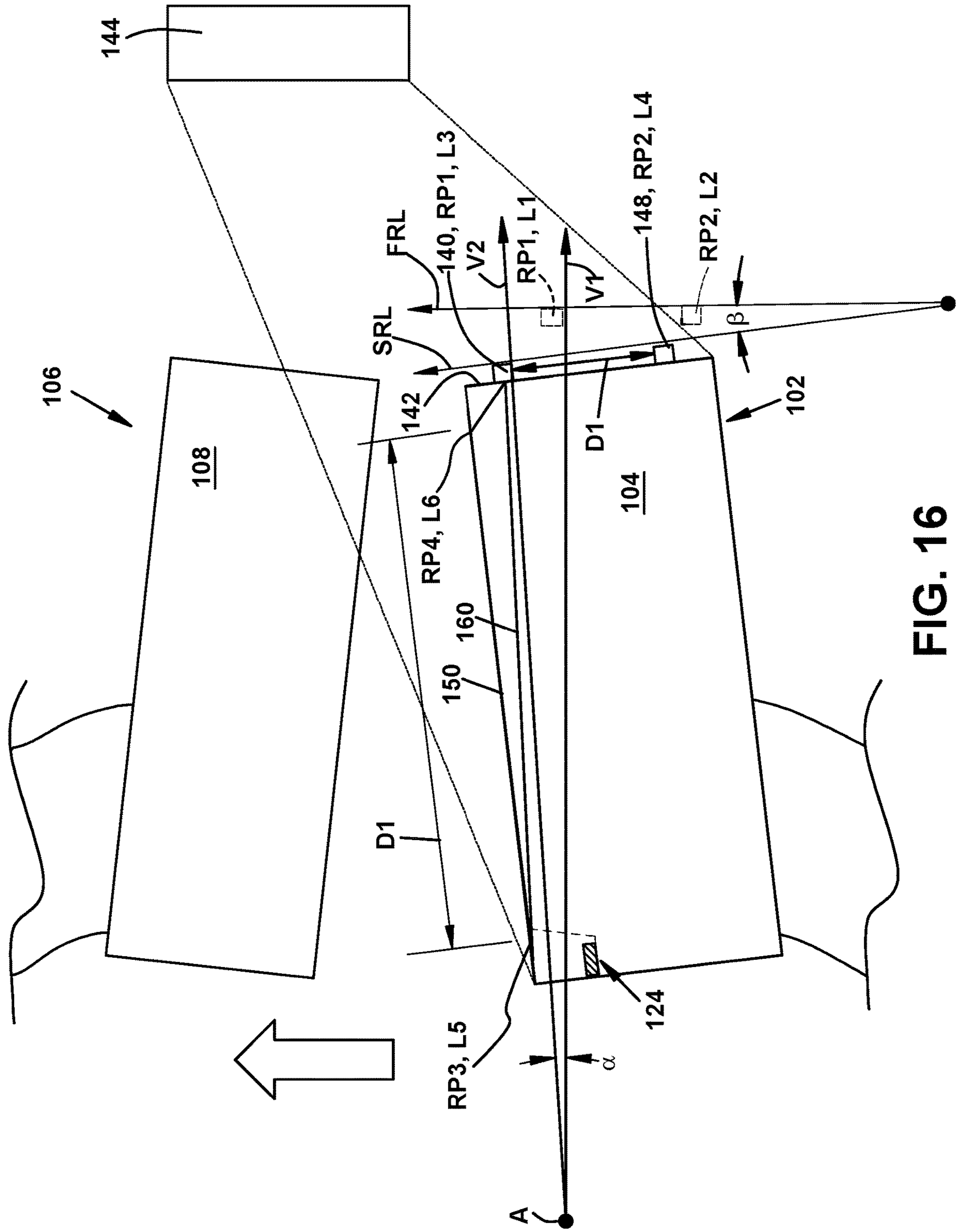
FIG. 16 shows a schematic cross-sectional view of the HJ flanges of a turbine casing in a top-off position at a primary axial location, according to embodiments of the disclosure.
Figure 17:
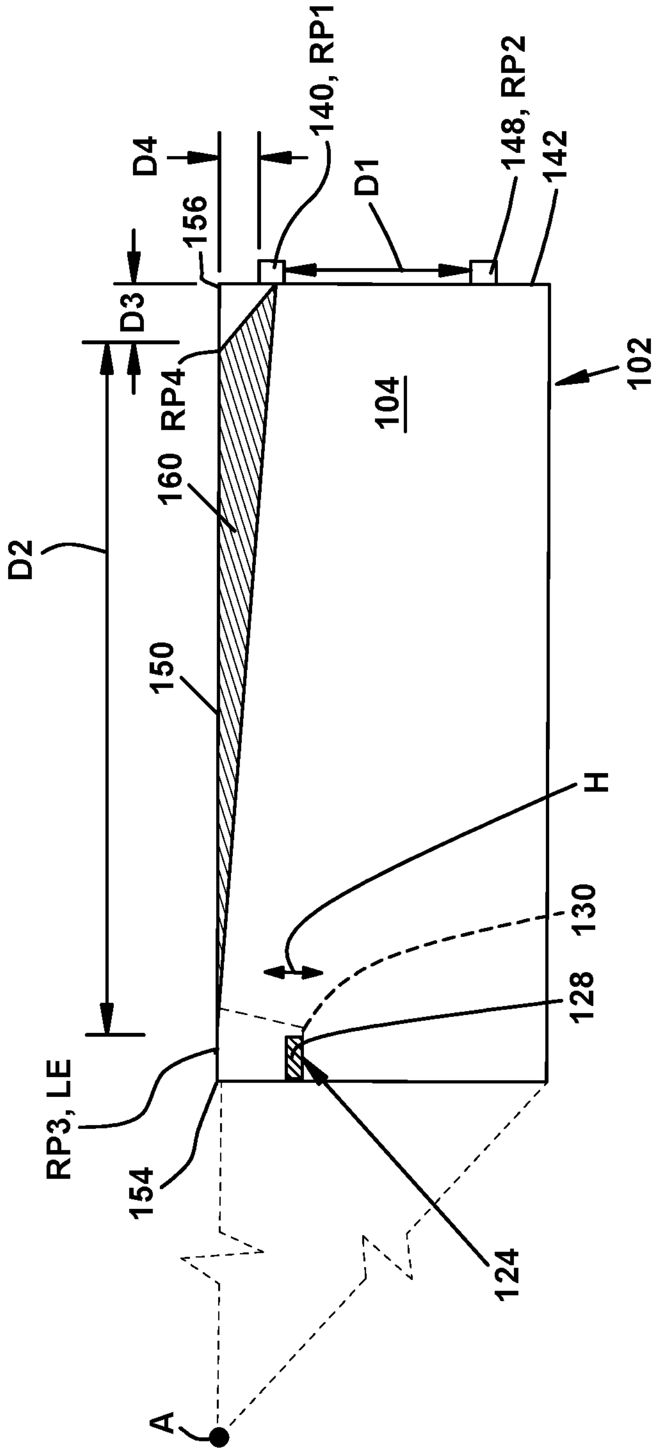
FIG. 17 shows an enlarged, schematic cross-sectional view of a lower HJ flange of a turbine casing at a primary axial location with potential adjustments illustrated, according to embodiments of the disclosure.

Referring to the flow diagram of FIG. 13, a method of aligning a component 120 (FIG. 3) within turbine casing 100 (FIG. 2) will now be described. FIG. 14 shows a perspective view of an illustrative lower casing 102 with a number of axial locations highlighted with cross-sectional planes, FIG. 15 shows an enlarged cross-sectional view of one side of HJ flanges 104, 108 in a top-on position of the turbine casing, FIG. 16 shows an enlarged cross-sectional view of one side of HJ flanges 104, 108 in an illustrative top-off position of the turbine casing, and FIG. 17 shows an enlarged, schematic cross-sectional view of an illustrative HJ flange 104 show potential adjustments. In FIGS. 15-17, rotor axis A is to the left (off the page), as illustrated. As will be described, a number of processes occur with lower casing 102 and upper casing 106 attached in a top-on position, as shown in FIGS. 2 and 15, and a number of processes occur with lower casing 102 and upper casing 106 in a de-coupled, top-off position, as shown in for example, FIGS. 3-11, 14 and 16.

Processes P10-P22 are carried out for at least one primary axial location along rotor axis A (FIG. 1), i.e., where first and second optical targets 140, 148 are both present (three shown in example in FIG. 2). As observed in FIG. 14, lower HJ flange 104 can change over an axial length thereof. For example, at different axial locations of lower HJ flange 104 (and upper HJ flange 108), it can have different, for example: shape, radial position relative to turbine rotor axis A, radial thickness, and/or structure therein (e.g., cooling channels (see e.g., FIG. 14)) extending therethrough. Processing according to embodiments of the disclosure can be carried out at different axial locations to provide highly customized adjustments for component support positions 124 at each axial location. In addition, since different sides of lower and upper casings 102, 106 can be differently situated even if evaluated at the same axial location, processes P10-P34 can be carried out at one or both sides 110L, 110R (FIG. 14) of turbine casing 100 (FIG. 2) at each axial location. While one primary axial location can be used, it is typically advantageous to use a plurality of primary axial locations to obtain better improvement in overall alignment.

Figure 13:
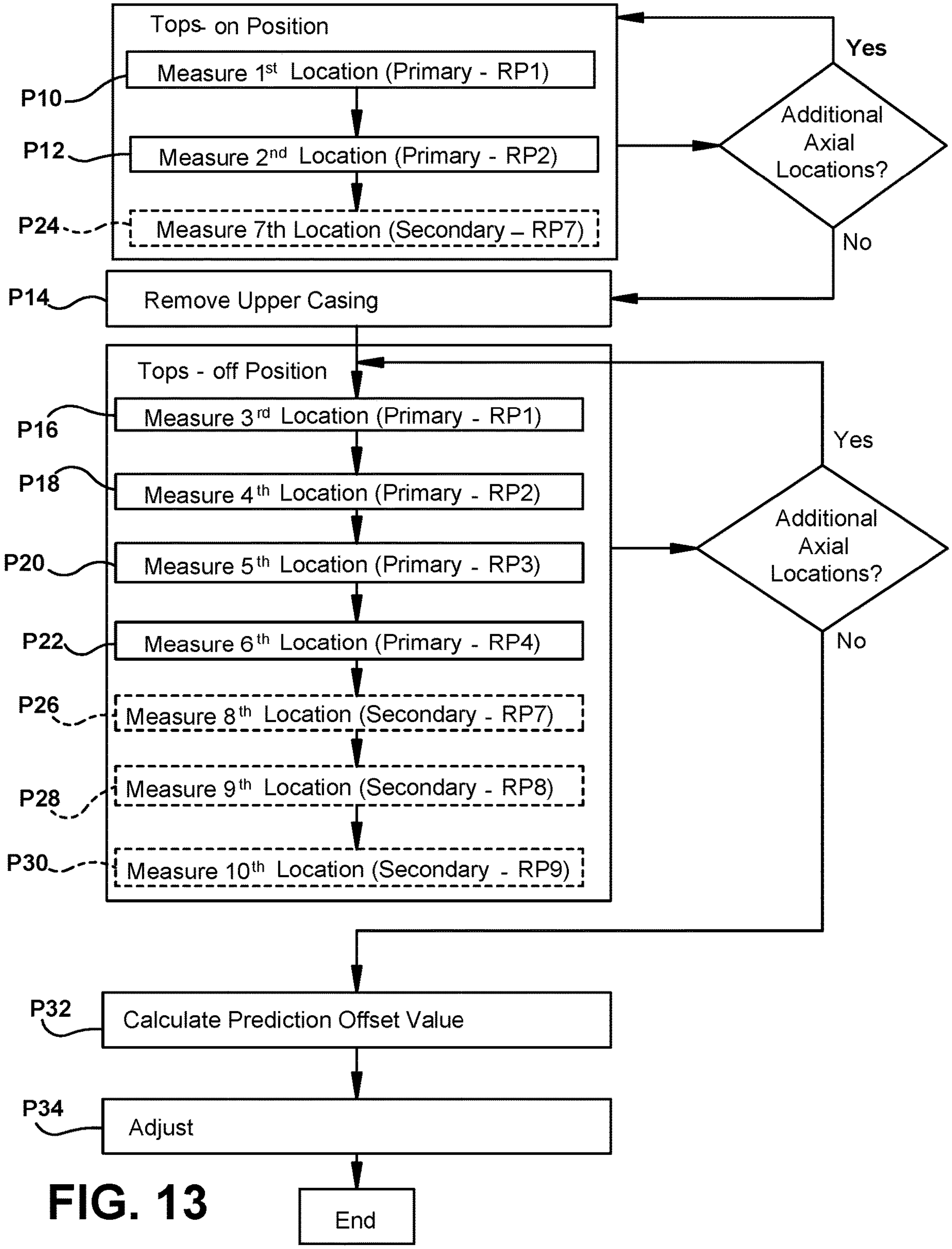
FIG. 13 shows a flow diagram of a method according to embodiments of the disclosure.

Referring to FIGS. 12 and 13, processes P10 and P12 are performed with lower and upper casings 102, 106 in a top-on position, as shown in FIG. 15. That is, upper casing 106 is coupled to lower casing 102 in a top-on position. In process P10, as shown in FIG. 15, measurement system 144 measures a first location L1 of first reference point RP1 at first optical target 140. As noted, first optical target 140 is coupled to outer surface 142 of lower HJ flange 104. Measurement system 144, as noted, may include any appropriate measurement system for measuring locations of reference points on casings 102, 106, e.g., using lasers. As noted, locations may be indicated by any now known or later developed three dimensional coordinate system.

In process P12, as shown in FIG. 15, measurement system 144 measures a second location L2 of a second reference point RP2 at a second optical target 148 coupled to outer surface 142 (FIG. 2) of lower HJ flange 104 and vertically spaced from first optical target 140 (FIG. 2). As noted, distance D1 between first and second reference points RP1, RP2 is defined, i.e., known. With processes P10 and P12, alignment system 146 may receive locations L1, L2 of reference points RP1, RP2 at measurement module 230 for use by calculation module 232 to calculate the prediction offset value. Note, optional process P24 occurring in a top-on position will be described further herein.

In process P14, and as shown in FIG. 16, upper casing 106 is removed from lower casing 102. This operation can be completed using any now known or later developed casing removal process including, for example, removing any insulation, piping, casing fasteners, etc., and lifting upper casing 106 off of lower casing 102. Upper casing 106 can be set aside for separate evaluation, as will be described herein. While not necessary, other parts that are internal to turbine casing 100 (FIG. 2) may also be removed such as but not limited to: remaining portions of upper casing 106, turbine rotor 14 (FIG. 1), a lower portion of diaphragm 122 (lower diaphragm), and/or lower casing 102 portions. As shown in FIG. 13, process P12 and P14 (and P24) may repeat for each primary (or secondary) axial location desired, e.g., three primary axial locations are shown in FIGS. 2 and 14, and over 20 secondary axial locations are shown in FIG. 2.

Processes P16-P22, and optional steps P26-P30, are performed with lower and upper casings 102, 106 in a top-off position, as shown in FIG. 16. As shown in FIG. 16, with upper casing 106 removed, lower casing 102, and in particular, lower HJ flange 104 thereof, may shift position, e.g., spring upward, rotate about rotor axis A, tilt inwardly or outwardly, etc. FIG. 16 shows only one possible scenario which matches FIG. 6 but includes rotation; however, lower casing 102 may take any position described in FIGS. 5-11. It is understood that the processing may be applied to any scenario.

In process P16, with at least upper casing 106 removed from lower casing 102 in a top-off position, measurement system 144 measures a third location L3 of first reference point RP1 at first optical target 140. Further, in process P18, with at least upper casing 106 removed from lower casing 102 in a top-off position, measurement system 144 measures a fourth location L4 of second reference point RP2 at second optical target 148. The shift in position of lower casing 102 can be observed by comparing third and fourth locations L3, L4 to first and second locations L1, L2 (FIG. 15, and shown in phantom in FIG. 16). In the FIG. 16 example, lower HJ flange 104 has moved vertically upward and tilt inwardly (counterclockwise) from the position shown in FIG. 15. Lower HJ flange 104 may have also rotated, e.g., counterclockwise, about rotor axis A.

In process P20, with at least upper casing 106 removed from lower casing 102 in a top-off position, measurement system 144 measures a fifth location of third reference point RP3 on upper surface 150 of lower HJ flange 104. As noted, third reference point RP3 has a known spatial relation to component support position 124 of component 120 in lower casing 102.

In process P22, with at least upper casing 106 removed from lower casing 102 in a top-off position, measurement system 144 measures a sixth location of fourth reference point RP4 on upper surface 150 of lower HJ flange 104 of lower casing 102. As noted, fourth reference point RP4 is spaced from third reference point RP3 on upper surface 150 of lower HJ flange 104 by a distance D1. After processes P16-P22, alignment system 146 may receive locations L3, L4, L5 and L6 of reference points RP1, RP2, RP3, RP4, respectively, at measurement module 230 (FIG. 12) for use by calculation module 232 (FIG. 12) to calculate the prediction offset value. As shown in FIG. 16, triangular spatial relationship 160 of reference points RP1, RP3 and RP4 can be measured, i.e., verifying actual spacing and angular relationships thereof, at each axial location.

With reference to FIGS. 13 and 22, processes P24-P30 are optional measurement steps for secondary axial locations. In process P24, in a top-on position shown partially in FIG. 22, measurement system 144 measures a seventh location L7 of a seventh optical target RP7 at a first optical target 140 at secondary axial location (just RP7 at seventh location L7 of lower casing 102 shown in top-on position in FIG. 22). Seventh reference point RP7 is substantially identical in function to first reference point RP1, except it is for a secondary axial location. That is, first optical target 140 is located at a different axial location than first optical target 140 in FIG. 16. In process P26, in a top-off position, shown in FIG. 22, measurement system 144 measures an eighth location L8 of seventh reference point RP7 at first optical target 140 at the secondary axial location. In process P28, in a top-off position, measurement system 144 measures a ninth location L9 of an eighth reference point RP8 on upper surface 150 of lower HJ flange 104. Eighth reference point RP8 is substantially identical in function to third reference point RP3, except it is for a secondary axial location. Hence, eighth reference point RP8 has a known spatial relation to the component support position 124 of component 120 (FIG. 4) in lower casing 102 at the respective secondary axial location. In process P28, in a top-off position, measurement system 144 measures, a tenth location L10 of a ninth reference point RP9 on upper surface 150 of lower HJ flange 104. Ninth reference point RP9 is substantially identical in function to fourth reference point RP4, except it is for a secondary axial location. Hence, ninth reference point RP9 is spaced from eighth reference point RP8 on upper surface 150 of lower HJ flange 104.

Top-off position measurement processes (P16-P30) may repeat for any desired number of primary and/or secondary axial locations. Measurement module 230 (FIG. 12) may receive all of the measured locations L1-L10.

In process P32, calculation module 232 (FIG. 12) may calculate the prediction offset value for component support position 124 in the top-on position based on first, second, third, fourth, fifth and sixth locations L1-L6 and inner radius (IR) of lower casing 102 for at least one of the primary axial locations. In addition, calculation module 232 (FIG. 12) may also calculate the prediction offset value for component support position 124 in the top-on position based on seventh, eighth, ninth and tenth locations L7-L10 and inner radius (IR) of lower casing 102 for at least one of the secondary axial location(s). It is also noted that calculation of the prediction offset value for component support position 124 in the top-on position for a first side of the turbine casing 100 includes accounting for the prediction offset value for the component support position 124 in the top-on position for a second, opposite side of the turbine casing. That is, the calculation balances the prediction offset value for each side to ensure changes to one side do not negatively impact or disturb changes to the other side, e.g., rotational adjustments that counteract one another.

Process P32 can take a variety of forms that can be performed individually, or together, in any combination. Consequently, the prediction offset value can take a variety of forms.

In process P34, the method may include a user adjusting component support position 124 in turbine casing 100 (FIG. 2) by the prediction offset value. The adjusting changes component support position 124 position to improve an alignment of component 120 (FIG. 15) with rotor axis A upon replacing upper casing 106 of turbine casing 100 (FIG. 2) to the top-on position. The adjusting may include, for example, as shown in FIG. 17, a change in a height (H) of component support position 124, e.g., by changing shim 128 and/or ledge 130. In any event, an alignment of component 120 (FIG. 4) positioned at component support position 124 is improved relative to rotor axis A upon replacing upper casing 106 to the top-on position (FIG. 15). Process P34 can take a variety of forms that can be performed individually, or together, in any combination, e.g., depending on the prediction offset value form.

The following sections will further describe the types of prediction offset value(s) that can be calculated by calculation module 232 (FIG. 12) in process P32, and the related adjustment(s) that can be performed based on the prediction offset value(s) in process P34.

a. Prediction Offset Value with Vertical Adjustment

In certain embodiments, prediction offset value may include a vertical adjustment. In a simplified form, as shown in FIG. 16, vertical adjustments can be determined directly from a vertical change in first location L1 and third location L3 of first reference point RP1, i.e., between the top-on position and the top-off position.

As described previously, and as shown in detail in FIG. 17, third reference point RP3 and fourth reference point RP4 on upper surface 150 of lower HJ flange 104, and first reference point RP1 at first optical target 140, define triangular spatial relationship 160 (shaded triangle). More specifically, triangular spatial relationship 160 represents the location of reference points RP1, RP3 and RP4 on lower HJ flange 104 as they are expected to exist. Triangular spatial relationship 160 thus provides a baseline through which changes in lower HJ flange 104 can be detected. Triangular spatial relationship 160 can be identified, for example, based on initial designs and/or manufacturing records of lower HJ flange 104, or based on previous manufacturing records of changes to lower HJ flange 104. However, triangular spatial relationship 160 may also be identified (or verified) by calculation module 232 (FIG. 12) based on the measured locations of reference points RP1, RP3, RP4 on lower HJ flange 104 in the top-off position in process P16, P20 and P22. As shown in FIG. 16, calculation module 232 also determines a rotation angle ($\alpha$) of lower HJ flange 104 about rotor axis A by calculating an angle between a first vector V1 extending from rotor axis A to first location L1 of first optical target 140 in top-on position and a second vector V2 from rotor axis A through third location L3 of first optical target 140 in the top-off position.

Figure 18:
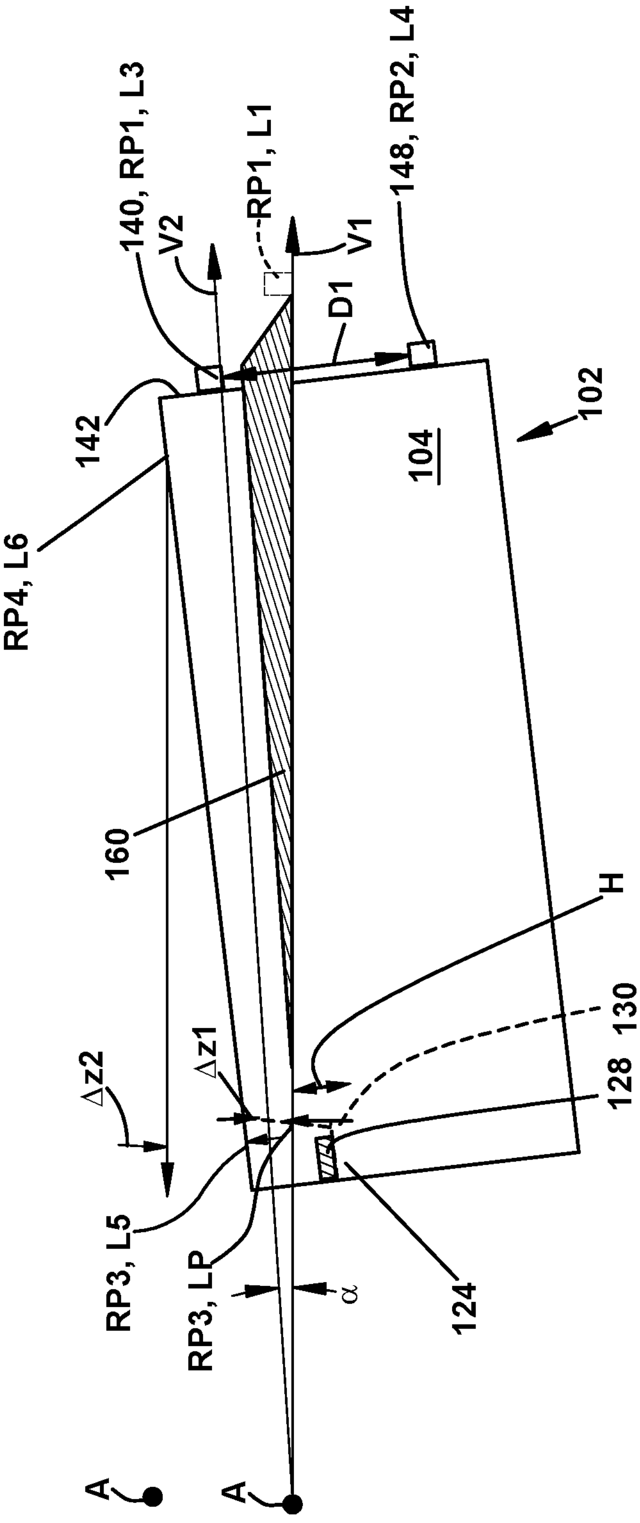
FIG. 18 shows a schematic cross-sectional view of a lower HJ flange of a turbine casing in a top-off position at a primary axial location and with a triangular spatial relationship translated thereon, according to embodiments of the disclosure.

As shown in FIG. 18, calculation module 232 can translate triangular spatial relationship 160 to the top-on position based on first reference point RP1 at first location L1 in the top-on position and rotation angle ($\alpha$) of lower HJ flange 104 about rotor axis A. That is, it rotates the triangular spatial relationship by rotation angle ($\alpha$). The translating creates a predicted top-on location LP for third reference point RP3 in the top-on position. In other words, calculation module 232 virtually places triangular spatial relationship 160 in the top-on position, using first reference point RP1 as the starting point. As shown in FIG. 18, triangular spatial relationship 160 may be moved vertically and/or rotated to match the rotation angle ($\alpha$) of lower HJ flange 104 in the top-on position. In this setting, predicted top-on location LP of third reference point RP3 indicates where vertically third reference point RP3 should be if there is no distortion in lower HJ flange 104. Calculation module 232 calculates any vertical difference ($\Delta z1$) between (actual) fifth location L5 of third reference point RP3 as measured and predicted top-on location LP for third reference point RP3 from expected triangular spatial relationship 160. Any vertical difference ($\Delta z1$) indicates a vertical change (FIGS. 17 and 18) in the location of third reference point RP3 caused, for example, by distortion in lower HJ flange 104 from use. Calculation module 232 (FIG. 12) calculates a vertical adjustment based on any vertical difference ($\Delta z1$) of lower HJ flange 104.

Process P34 may include adjusting component support position 124 to one of raise or lower (H) the component support position 124 based on the vertical adjustment and the known spatial relation of third reference point RP3 to component support position 124 of component 120 in lower casing 102. For example, if predicted top-on position LP is 1 millimeter higher than the actual, fifth location L5 of third reference point RP3, then component support position 124, e.g., ledge 130 and/or shim 128, can be lowered in the tops off condition to accommodate the distortion in lower HJ flange 104 so that it is in the correct location when the tops is on and bolted.

In other embodiments, as also shown in FIG. 16, vertical adjustments can also be determined from based on a tilt angle (β) of lower HJ flange 104, i.e., between the top-on position and the top-off position. That is, tilt angle (β) of lower HJ flange 104 also indicates a vertical change of third reference point RP3 between the top-on position and the top-off position. Here, calculation module 232 (FIG. 12) calculates the prediction offset value by, as shown in FIG. 16, determining a tilt angle (β) of lower HJ flange 104 by calculating an angle between a first reference line (FRL) extending through first and second locations L1, L2 (shown in phantom in FIG. 16, and solid line in FIG. 15) of first and second optical targets 140, 148 in top-on position (FIG. 15), and a second reference line (SRL) extending through third and fourth locations L3, L4 of first and second optical targets 140, 148 in the top-off position (FIG. 16). Tilt angle (β) captures any inward or outward tilting of lower HJ flange 104 that changes its radial distance from rotor axis A, and a vertical position of component support position 124. In the scenarios of FIG. 16 and FIGS. 6, 8 and 11, lower HJ flange 104 tilts counterclockwise to the top-off position. In FIGS. 7, 9 and 10 scenarios, lower HJ flange 104 tilts clockwise to the top-off position.

Here, as shown in FIG. 18, calculation module 232 also calculates any additional vertical difference (Δz2) between (actual) fifth location L5 of third reference point RP3 as measured and predicted top-on location LP for third reference point RP3 from tilt angle (β) of lower HJ flange 104. Note, vertical difference (Δz2) is shown in an exaggerated size for purposes of clarity of illustration, e.g., Δz1 may not be smaller than Δz2. Tilt angle (β) of lower HJ flange 104 may be translated to, for example, reference point RP4 and a vertical difference at third reference point RP3 evaluated to identify a change in position of third reference point RP3 caused by tilting of lower HJ flange 104. Any vertical difference (Δz2) indicates an additional vertical change (FIG. 18) in the location of third reference point RP3 caused, for example, by distortion in lower HJ flange 104 from use. Calculation module 232 (FIG. 12) calculates a vertical adjustment based on any vertical difference (Δz1) and tilt angle (β), i.e., any vertical difference (Δz2), of lower HJ flange 104.

Process P34, as noted previously, may include adjusting component support position 124 to one of raise or lower (H) component support position 124 based on the vertical adjustment and the known spatial relation of third reference point RP3 to component support position 124 of component 120 in lower casing 102. For example, if predicted top-on position LP is a determined to be an additional 0.2 millimeters off due to tilting (i.e., collectively 1.2 millimeter higher than the actual, fifth location L5 of third reference point RP3), then component support position 124, e.g., ledge 130 and/or shim 128, can be lowered in the tops off condition to accommodate the distortion in lower HJ flange 104 so that it is in the correct location when the tops is on and bolted.

b. Prediction Offset Value with Horizontal Adjustment

Figure 19:
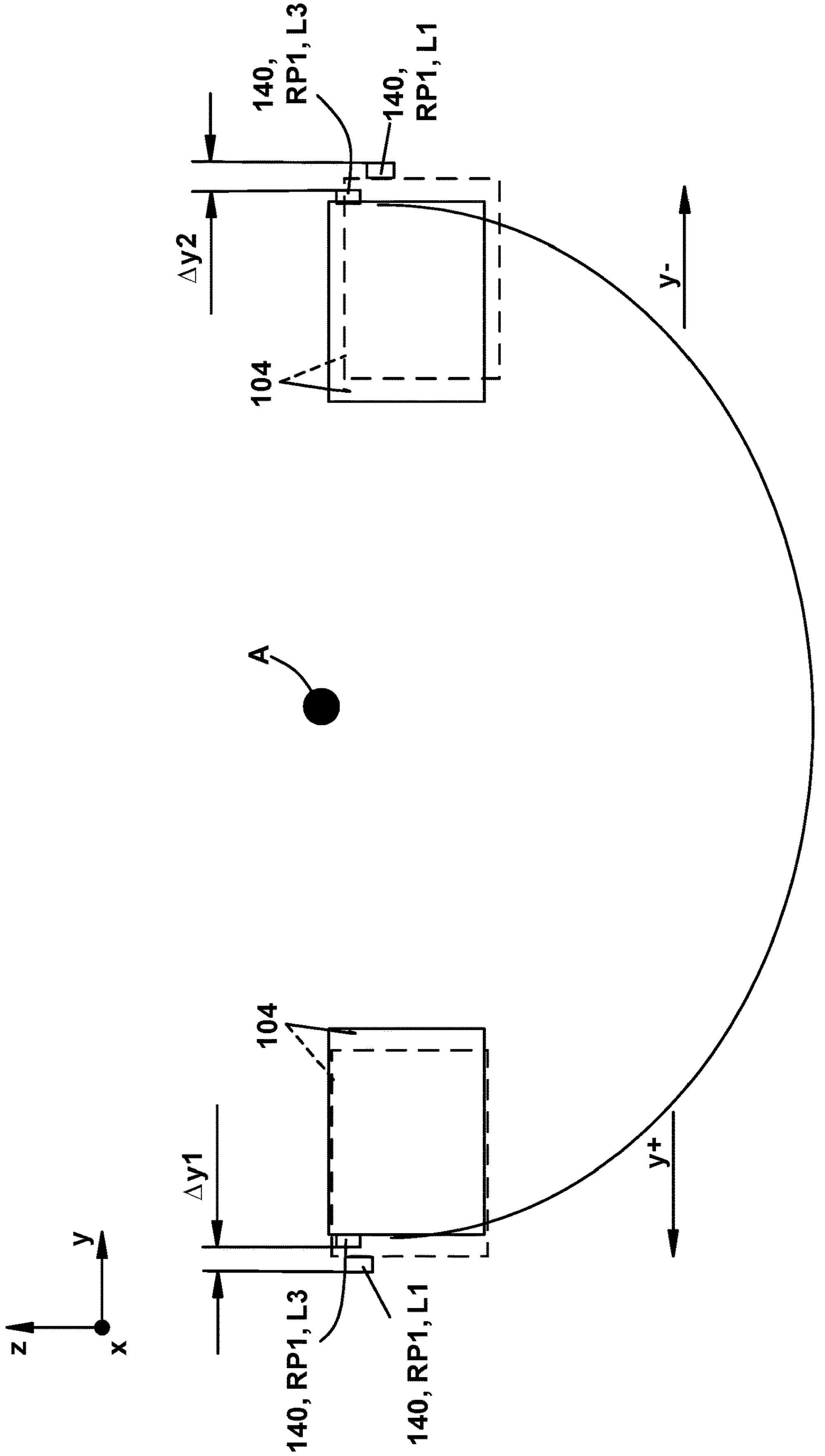
FIG. 19 shows a schematic cross-sectional view of a HJ flange for calculating a horizontal adjustment, according to embodiments of the disclosure.

Referring to FIG. 19, calculation module 232 calculate a first horizontal difference (Δy1) between first location L1 of first optical target 140 in the top-on position (dashed lines) and third location L3 of first optical target 140 in top-off position (solid lines) at a first side of lower casing 102, and a second horizontal difference (Δy2) between first location L1 of first optical target 140 in top-on position (dashed lines) and third location L3 of first optical target 140 in top-off position (sold lines) at a second side of lower casing 102. Calculation module 232 sums first horizontal difference (Δy1) and second horizontal difference (Δy2) to attain a horizontal adjustment. For example, if first horizontal difference (Δy1) is 8 units, and second horizontal difference (Δy2) is −5 units, the sum and horizontal adjustment would be 3 units.

In process P34, the adjusting would include adjusting component support position 124 based on the horizontal adjustment and the known spatial relation of third reference point RP3 (FIGS. 16-18) to component support position 124 (FIGS. 16-18) of component 120 in lower casing 102.

c. Prediction Offset Value with HJ Flange Surface Distortion Adjustment

Figure 20:
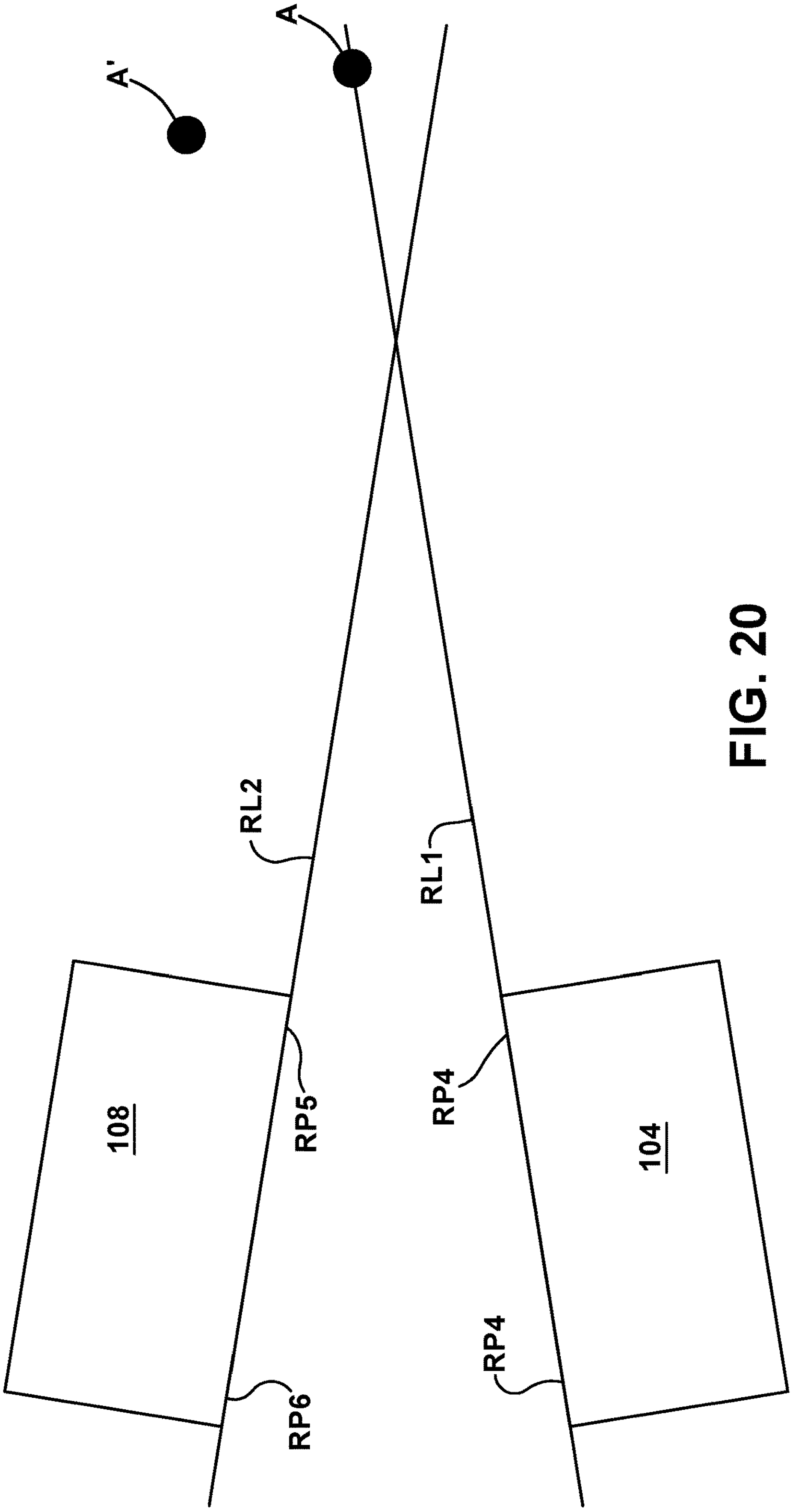
FIG. 20 shows a schematic cross-sectional view of a HJ flanges superimposed with surface reference lines to identify a surface distortion, according to embodiments of the disclosure.
Figure 21:
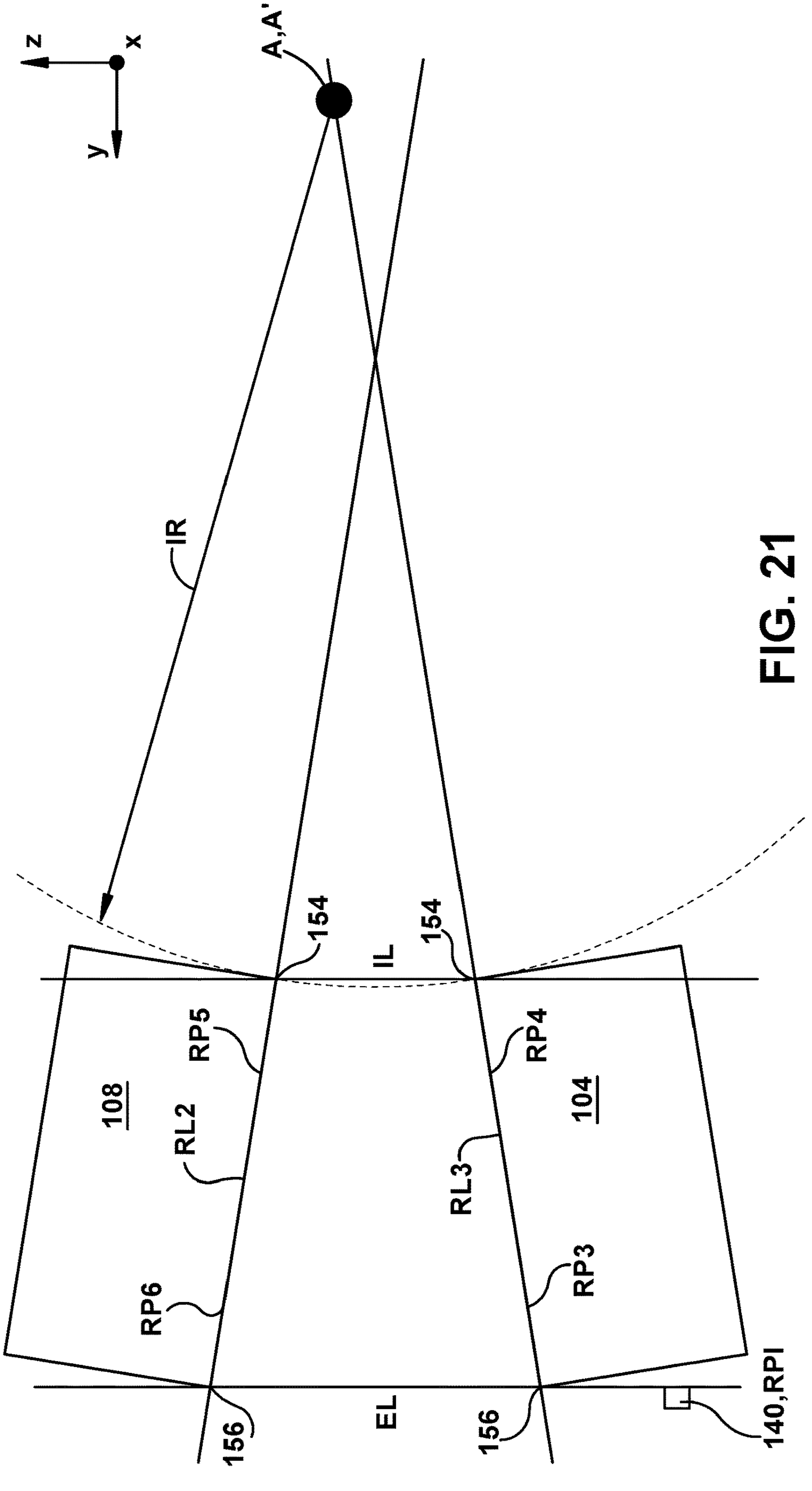
FIG. 21 shows a schematic cross-sectional view of establishing an angular relationship between the reference lines of FIG. 20, according to embodiments of the disclosure.

Referring to FIGS. 13, 20 and 21, in certain embodiments, the prediction offset value may include a HJ flange 104, 108 surface distortion adjustment to component support position 124. FIG. 20 shows a schematic cross-sectional view of lower HJ flange 104 and upper HJ flange 108 in a top-off position with axis on the right. It is noted that while upper casing 106 is shown elevated above lower casing 102, it may actually be laying in any orientation off of lower casing, e.g., in a support remote from lower casing 102, flipped over on a floor, etc. As illustrated, with upper casing 106 in position to be mounted to lower casing 102 (virtually, with perhaps HJ flange surfaces beginning to touch), a gap G may exist, in the example shown, between third reference point RP3 and fifth reference point RP5. Gap G represents an opening that would remain when lower casing 102 and upper casing 106 are moved to the top-on position caused by HJ flange surface distortion and in existence prior to closing the gap as upper casing 106 is fastened to lower casing 102. As illustrated in the example of FIG. 21, if lower casing 102 and upper casing 106 are moved to the top-on position, inner edges 154 would meet before outer edges 156 of HJ flanges 104, 108, creating a gap G at an outer location near third reference point RP3 and fifth reference point RP5. Note, gap G is shown in an exaggerated size in the drawings for purposes of clarity of illustration. Gap G disappears as casings 102, 106 are fastened together. It can be observed in FIG. 20 that gap G is at least partially correlated to tilt angle (β), such that a prediction offset value to address gap G can be based, in part, on tilt angle (β). In one non-limiting example, a prediction offset value to address gap G can be based on half of tilt angle (β), assuming half of tilt angle (β) is absorbed by each HJ flange 104, 108 during reconnection of casings 102, 106. In process P32, calculation module 232 can calculate the prediction offset value for component support position 124 in the top-on position based on at least the first, second, third, fourth, fifth and sixth locations L1-L6 of lower casing 102 and any gap G. In one example, calculation module 232 can calculate the prediction offset value to include a HJ flange surface distortion adjustment at third reference point RP3 to accommodate half of tilt angle (β) to address gap G. It is appreciated that gap G could also be between fourth and sixth reference points RP4, RP6 if HJ flanges 104, 108 tilt in an opposite direction. It is also appreciated that no gap G may exist where HJ flanges 104, 108 remain parallel to one another.

In process P34, component support position 124 (see e.g., FIG. 18) may be adjusted in turbine casing 100 (FIG. 2) by the prediction offset value including the HJ flange surface distortion adjustment.

In an optional embodiment, in order to confirm the presence and/or extent of gap G, in certain embodiments, as shown in FIG. 20, calculation module 232 can also calculate any gap G at an inner location near third reference point RP3 and fifth reference point RP5, or an outer location near fourth reference point RP4 and sixth reference point RP6 based on an angular relationship between a first reference line RL1 and a second reference line RL2 and the inner radius IR of lower casing 102. Again, gap G represents an opening that would remain when lower casing 102 and upper casing 106 are moved to the top-on position caused by HJ flange surface distortion and in existence prior to closing the gap as upper casing 106 is fastened to lower casing 102. As illustrated in the example of FIG. 21, if lower casing 102 and upper casing 106 are moved to the top-on position, inner edges 154 would meet before outer edges 156 of HJ flanges, creating a gap at an outer location near third reference point RP3 and fifth reference point RP5.

As shown in FIG. 20, in process P32, calculation module 232 identifies a first reference line RL1 through third reference point RP3 and fourth reference point RP4 on lower HJ flange 104 in a top-off position. Further, in process P32, calculation module 232 identifies a second reference line RL2 through a fifth reference point and a sixth reference point of a lower (as shown) surface 152 of upper HJ flange 108. As illustrated, rotor axis A is known for lower casing 102, and a rotor axis A' is (virtually) known for upper casing 106, e.g., the latter based on its shape, inner radius and perhaps other dimensions. As shown in FIG. 21, calculation module 232 establishes an angular relationship between first reference line RL1 and second reference line RL2 by superimposing rotor axis A' of upper HJ flange 108 in the top-off position with rotor axis A of lower HJ flange 104 in the top-off position. Calculation module 232 can then calculate (confirm) any gap G at an inner location near third reference point RP3 and fifth reference point RP5, or an outer location near fourth reference point RP4 and sixth reference point RP6 based on the angular relationship between first reference line RL1 and second reference line RL2 and the inner radius IR of lower casing 102. Again, gap G represents an opening that would remain when lower casing 102 and upper casing 106 are moved to the top-on position caused by HJ flange surface distortion and in existence prior to closing the gap as upper casing 106 is fastened to lower casing 102. As illustrated in the example of FIG. 21, if lower casing 102 and upper casing 106 are moved to the top-on position, inner edges 154 would meet before outer edges 156 of HJ flanges, creating a gap at an outer location near third reference point RP3 and fifth reference point RP5. Gap G can be calculated (confirmed) by, for example, differencing a length of lines IL and line EL, which are both parallel to vertical axis z. IL extends between inner edges 154, and EL extends between outer edges 156. The location of inner and outer edges 154, 156 can be (virtually) calculated based on the other reference points locations and inner radius IR. It is recognized, based on the scenarios in FIGS. 5-11, a gap may also exist at the inner location. Calculation module 232 calculates the prediction offset value for component support position 124 in the top-on position based on at least the first, second, third, fourth, fifth and sixth locations L1-L6 of lower casing 102 and any gap.

In process P34, component support position 124 (see e.g., FIG. 18) may be adjusted in turbine casing 100 (FIG. 2) by the prediction offset value including the HJ flange surface distortion adjustment.

d. Prediction Offset Value for Secondary Axial Locations

As noted previously, any number of secondary axial locations (FIG. 2) may be provided along rotor axis A that are different than each primary axial location. As shown in FIGS. 2, 14 and 22, each secondary axial location includes first optical target 140 but no second optical target 148, i.e., they have only first optical target 140. Embodiments of the disclosure for at least one secondary axial location may occur at one or both sides of turbine casing 100. In process P24-P28, measurement system 144 measures seventh, eighth, ninth and tenth locations L7-L10, as shown in FIGS. 13 and 22, at a secondary axial location. Measurement module 230 (FIG. 12) may receive locations L7-L10, and in process P32, calculation module 232 (FIG. 12) may calculate the prediction offset value for component support position 124 in the top-on position based on seventh, eighth, ninth and tenth locations L7-L10 and inner radius IR of lower casing 102 for at least one of secondary axial location. Any of the aforementioned prediction offset values for primary axial locations can be calculated for each secondary axial location. Where tilt angle (β) is required for the calculation, the value is unknown for each secondary axial location because no second reference point RP2 and second optical target 148 is provided at those axial locations. In this case, the calculation may use the tilt angle (β) value of the nearest primary axial location.

In process P34, component support position 124 in turbine casing 100 (FIG. 2) at secondary axial location(s) may be adjusted by the prediction offset value therefor in a similar fashion as that described relative to the primary axial locations. The alignment of component 120 (FIG. 15) positioned at component support position 124 for secondary axial location(s) is improved relative to rotor axis A upon replacing upper casing 106 to the top-on position.

Processing may be completed by replacing any parts removed from lower casing 102 and/or upper casing 106, and replacing upper casing 106 on lower casing 102, and fastening it back in place per any now known or later developed technique.

E. Conclusion

Embodiments of the disclosure provide a method, system and turbine casing for aligning components that does not require numerous removing steps of the upper casing, thus making the process simpler, safer and less time consuming. The method also provides accurate results without direct measurement of component support positions. The method is also highly flexible and can handle unsymmetrical turbine casings. Technical effect is an alignment system capable of providing adjustments for one or more casings of a turbine casing to align components to be supported therein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "receiving" data (e.g., locations, etc.). It is understood that the corresponding data can be obtained using any solution. For example, the corresponding system/component can include measurement system 144 or another system capable of generating and/or being used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of aligning a component within a turbine casing having two sides that are opposed, the turbine casing including an upper casing and a lower casing configured to collectively surround a rotor, the rotor having a rotor axis, the method comprising:

for at least one primary axial location along the rotor axis and at one or both sides of the turbine casing at each primary axial location:

with the upper casing coupled to the lower casing in a top-on position:

measuring a first location of a first reference point on the lower casing; and measuring a second location of a second reference point on the lower casing that is spaced apart from the first reference point;

with the upper casing removed from the lower casing in a top-off position:

measuring a third location of the first reference point;

measuring a fourth location of the second reference point;

measuring a fifth location of a third reference point on the lower casing, wherein the third reference point is hidden when the upper casing is in the top-on position, the third reference point having a known spatial relation to a component support position of a respective component at the respective primary axial location; and calculating a prediction offset value for the component support position in the top-on position based on at least the first, second, third, fourth, and fifth locations and an inner radius of the lower casing; and adjusting the component support position in the turbine casing by the prediction offset value, wherein an alignment of the component positioned at the component support position is improved relative to the rotor axis upon replacing the upper casing to the top-on position.

2. The method of claim 1, wherein the first reference point and the second reference point are on an outer surface of the lower casing.

3. The method of claim 1, wherein the third reference point is on an upper surface of a horizontal joint flange of the lower casing.

4. The method of claim 1, further comprising measuring a sixth location of a fourth reference point on the lower casing in the top-off position, wherein the fourth reference point is hidden when the upper casing is in the top-on position, and wherein the calculating the prediction offset value is also based on the sixth location.

5. The method of claim 1, further comprising mounting a respective optical target at each reference point.

6. The method of claim 1, wherein the at least one primary axial location includes a plurality of primary axial locations, and wherein the one or both sides of the turbine casing includes both sides of the turbine casing, and the calculating the prediction offset value for the component support position in the top-on position for a first side of the turbine casing includes accounting for the prediction offset value for the component support position in the top-on position for a second, opposite side of the turbine casing.

7. The method of claim 1, wherein the calculating the prediction offset value includes:

identifying a triangular spatial relationship between the fifth location of the third reference point on the upper surface of the HJ flange of the lower casing, and the third location of the first reference point at the first optical target;

determining a rotation angle of the HJ flange of the lower casing about the rotor axis by calculating an angle between a first vector extending from the rotor axis to the first location of the first optical target in the top-on position and a second vector from the rotor axis through the third location of the first optical target in the top-off position;

translating the triangular spatial relationship to the top-on position based on the first reference point at the first location in the top-on position and the rotation angle of the HJ flange of the lower casing about the rotor axis, the translating creating a predicted top-on location for the third reference point in the top-on position;

calculating a vertical difference between the fifth location of the third reference point as measured and the predicted top-on location for the third reference point; and calculating a vertical adjustment based on a vertical difference of the HJ flange of the lower casing, wherein the adjusting includes adjusting the component support position to one of raise or lower the component support position based on the vertical adjustment and the known spatial relation of the third reference point to the component support position of the component in the lower casing.

8. The method of claim 7, wherein the calculating the prediction offset value further includes:

determining a tilt angle of the HJ flange of the lower casing by calculating an angle between a first reference line extending through the first and second locations of the first and second reference points in the top-on position and a second reference line extending through the third and fourth locations of the first and second reference points in the top-off position;

calculating a vertical difference between the fifth location of the third reference point as measured and the predicted top-on location for the third reference point; and calculating the vertical adjustment based on a vertical difference and the tilt angle of the HJ flange of the lower casing.

9. The method of claim 7, wherein the calculating the prediction offset value includes:

calculating a first horizontal difference between the first location of the first reference point in the top-on position and the third location of the first reference point in the top-off position at a first side of the lower casing;

calculating a second horizontal difference between the first location of the first reference point in the top-on position and the third location of the first reference point in the top-off position at a second side of the lower casing; and summing the first horizontal difference and the second horizontal difference to attain a horizontal adjustment, and wherein the adjusting includes adjusting the component support position based on the horizontal adjustment and the known spatial relation of the third reference point to the component support position of the component in the lower casing.

10. The method of claim 7, wherein the calculating the prediction offset value further includes:

with the upper casing in position to be mounted to the lower casing, calculating a gap at an inner location near the third reference point and a fifth reference point on the upper casing, or at an outer location near the fourth reference point and a sixth reference point on the upper casing, based on the tilt angle; and calculating the prediction offset value for the component support position in the top-on position based on at least the first, second, third, fourth, fifth and sixth locations of the lower casing and the gap.

11. The method of claim 1, wherein the calculating the prediction offset value includes:

calculating a first horizontal difference between the first location of the first reference point in the top-on position and the third location of the first reference point in the top-off position at a first side of the lower casing;

calculating a second horizontal difference between the first location of the first reference point in the top-on position and the third location of the first reference point in the top-off position at a second side of the lower casing; and summing the first horizontal difference and the second horizontal difference to attain a horizontal adjustment, and wherein the adjusting includes adjusting the component support position based on the horizontal adjustment and the known spatial relation of the third reference point to the component support position of the component in the lower casing.

12. The method of claim 1, wherein the calculating the prediction offset value further includes:

with at least the upper casing removed from the lower casing in the top-off position:

identifying a first reference line through the third reference point and a fourth reference point on the HJ flange of the lower casing;

identifying a second reference line through a fifth reference point and a sixth reference point on a lower surface of the HJ flange of the upper casing, the fifth reference point aligned with the third reference point in the top-on position and the sixth reference point aligned with the fourth reference point in the top-on position;

establishing an angular relationship between the first reference line and the second reference line by superimposing the rotor axis of the HJ flange of the upper casing in the top-off position with the rotor axis of the HJ flange of the lower casing in the top-off position;

calculating a gap at an inner location near the third reference point and the fifth reference point, or at an outer location near the fourth reference point and the sixth reference point based on the angular relationship between the first reference line and the second reference line and the inner radius of the lower casing;

calculating the prediction offset value for the component support position in the top-on position based on at least the first, second, third, fourth, fifth and sixth locations of the lower casing and the gap; and adjusting the component support position in the turbine casing by the prediction offset value, wherein an alignment of the component positioned at the component support position is improved relative to the rotor axis upon replacing the upper casing to the top-on position.

13. A system for aligning a component within a turbine casing having two sides that are opposed, the turbine casing including an upper casing and a lower casing configured to collectively surround a rotor, the rotor having a rotor axis, the system comprising:

at least one primary axial location along the rotor axis, each primary axial location including a respective first reference point on the lower casing;

a measurement module configured to, for each primary axial location and at one or both sides of the turbine casing at each primary axial location:

with the upper casing coupled to the lower casing in a top-on position, receive a measurement of:

a first location of the first reference point; and a second location of a second reference point on the lower casing that is spaced apart from the first reference point;

with at least the upper casing removed from the lower casing in a top-off position, receive a measurement of:

a third location of the first reference point;

a fourth location of the second reference point; and a fifth location of a third reference point on the lower casing, wherein the third reference point is hidden when the upper casing is in the top-on position, the third reference point having a known spatial relation to a component support position of a respective component at the respective primary axial location; and a calculation module configured to:

calculate a prediction offset value for the component support position in the top-on position based on at least the first, second, third, fourth, and fifth locations and an inner radius of the lower casing; and indicate an adjustment for the component support position in the turbine casing at the at least one primary axial location based on the prediction offset value.

14. The system of claim 13, wherein the measurement module is further configured to, for each primary axial location, receive a measurement of a sixth location of a fourth reference point on the lower casing, and wherein the calculation module is further configured to calculate the prediction offset value also based on the sixth location.

15. The system of claim 13, wherein the calculation module is further configured to:

identify a triangular spatial relationship between the fifth location of the third reference point on the upper surface of the HJ flange of the lower casing, and the third location of the first reference point at the first optical target;

determine a rotation angle of the HJ flange of the lower casing about the rotor axis by calculating an angle between a first vector extending from the rotor axis to the first location of the first optical target in the top-on position and a second vector from the rotor axis through the third location of the first optical target in the top-off position;

translate the triangular spatial relationship to the top-on position based on the first reference point at the first location in the top-on position and the rotation angle of the HJ flange of the lower casing about the rotor axis, the translating creating a predicted top-on location for the third reference point in the top-on position;

calculate a vertical difference between the fifth location of the third reference point as measured and the predicted top-on location for the third reference point; and calculate a vertical adjustment based on a vertical difference of the HJ flange of the lower casing, wherein the indicated adjustment includes an adjustment of the component support position to one of raise or lower the component support position based on the vertical adjustment and the known spatial relation of the third reference point to the component support position of the component in the lower casing.

16. The system of claim 15, wherein the calculation module is further configured to:

determine a tilt angle of the HJ flange of the lower casing by calculating an angle between a first reference line extending through the first and second locations of the first and second reference points in the top-on position and a second reference line extending through the third and fourth locations of the first and second reference points in the top-off position;

calculate a vertical difference between the fifth location of the third reference point as measured and the predicted top-on location for the third reference point; and calculate the vertical adjustment based on a vertical difference and the tilt angle of the HJ flange of the lower casing.

17. The system of claim 15, wherein the calculation module is further configured to:

calculate a first horizontal difference between the first location of the first reference point in the top-on position and the third location of the first reference point in the top-off position at a first side of the lower casing;

calculate a second horizontal difference between the first location of the first reference point in the top-on position and the third location of the first reference point in the top-off position at a second side of the lower casing; and sum the first horizontal difference and the second horizontal difference to attain a horizontal adjustment, and wherein the indicated adjustment includes an adjustment of the component support position based on the horizontal adjustment and the known spatial relation of the third reference point to the component support position of the component in the lower casing.

18. The system of claim 15, wherein the calculation module is further configured to:

with the upper casing in position to be mounted to the lower casing, calculate a gap at an inner location near the third reference point and a fifth reference point on the upper casing, or an outer location near the fourth reference point and a sixth reference point on the upper casing, based on the tilt angle; and calculate the prediction offset value for the component support position in the top-on position based on at least the first, second, third, fourth, fifth and sixth locations of the lower casing and the gap.

19. The system of claim 13, wherein the calculation module is further configured to:

calculate a first horizontal difference between the first location of the first reference point in the top-on position and the third location of the first reference point in the top-off position at a first side of the lower casing;

calculate a second horizontal difference between the first location of the first reference point in the top-on position and the third location of the first reference point in the top-off position at a second side of the lower casing; and sum the first horizontal difference and the second horizontal difference to attain a horizontal adjustment, and wherein the indicated adjustment includes an adjustment of the component support position based on the horizontal adjustment and the known spatial relation of the third reference point to the component support position of the component in the lower casing.

20. The system of claim 13, wherein the calculation module is further configured to:

with at least the upper casing removed from the lower casing in the top-off position:

identify a first reference line through the third reference point and a fourth reference point on the HJ flange of the lower casing;

identify a second reference line through a fifth reference point and a sixth reference point on a lower surface of the HJ flange of the upper casing, the fifth reference point aligned with the third reference point in the top-on position and the sixth reference point aligned with the fourth reference point in the top-on position;

establish an angular relationship between the first reference line and the second reference line by superimposing the rotor axis of the HJ flange of the upper casing in the top-off position with the rotor axis of the HJ flange of the lower casing in the top-off position;

calculate a gap at an inner location near the third reference point and the fifth reference point, or an outer location near the fourth reference point and the sixth reference point based on the angular relationship between the first reference line and the second reference line and the inner radius of the lower casing; and calculate the prediction offset value for the component support position in the top-on position based on at least the first, second, third, fourth, fifth and sixth locations of the lower casing and the gap, wherein the indicated adjustment includes an adjustment of the component support position in the turbine casing by the prediction offset value, and wherein an alignment of the component positioned at the component support position is improved relative to the rotor axis upon replacing the upper casing to the top-on position.

* * * * *